(12) United States Patent
Georgiev et al.

(10) Patent No.: US 7,962,033 B2
(45) Date of Patent: Jun. 14, 2011

(54) METHODS AND APPARATUS FOR FULL-RESOLUTION LIGHT-FIELD CAPTURE AND RENDERING

(75) Inventors: Todor G. Georgiev, Sunnyvale, CA (US); Andrew Lumsdaine, Bloomington, IN (US)

(73) Assignee: Adobe Systems Incorporated, San Jose, CA (US)

( * ) Notice: Subject to any disclaimer, the term of this patent is extended or adjusted under 35 U.S.C. 154(b) by 131 days.

(21) Appl. No.: 12/271,389

(22) Filed: Nov. 14, 2008

(65) Prior Publication Data
US 2009/0185801 A1 Jul. 23, 2009

Related U.S. Application Data

(60) Provisional application No. 61/023,036, filed on Jan. 23, 2008.

(51) Int. Cl.
*G03B 41/00* (2006.01)
(52) U.S. Cl. ......................................................... 396/332
(58) Field of Classification Search .................. 396/330, 396/332
See application file for complete search history.

(56) References Cited

U.S. PATENT DOCUMENTS

| | | | |
|---|---|---|---|
| 725,567 A | 4/1903 | Ives | |
| 2,039,648 A | 5/1936 | Ives | |
| 3,985,419 A | 10/1976 | Matsumoto et al. | |
| 4,180,313 A | 12/1979 | Inuiya | |
| 4,193,093 A | 3/1980 | St. Clair | |
| 4,732,453 A | 3/1988 | de Montebello et al. | |
| 4,849,782 A | 7/1989 | Koyama et al. | |
| 5,076,687 A | 12/1991 | Adelson | |
| 5,361,127 A | 11/1994 | Daily | |
| 5,400,093 A | 3/1995 | Timmers | |
| 5,659,420 A | 8/1997 | Wakai et al. | |
| 5,729,011 A | 3/1998 | Sekiguchi | |
| 5,946,077 A | 8/1999 | Nemirovskiy | |
| 6,097,541 A | 8/2000 | Davies et al. | |
| 6,137,937 A | 10/2000 | Okano et al. | |
| 6,268,846 B1 | 7/2001 | Georgiev | |

(Continued)

FOREIGN PATENT DOCUMENTS

EP 1548481 6/2005

(Continued)

OTHER PUBLICATIONS

U.S. Appl. No. 12/503,803, filed Jul. 15, 2009.

(Continued)

*Primary Examiner* — W. B. Perkey
(74) *Attorney, Agent, or Firm* — Robert C. Kowert; Meyertons, Hood, Kivlin, Kowert & Goetzel, P.C.

(57) ABSTRACT

Method and apparatus for full-resolution light-field capture and rendering. A radiance camera is described in which the microlenses in a microlens array are focused on the image plane of the main lens instead of on the main lens, as in conventional plenoptic cameras. The microlens array may be located at distances greater than f from the photosensor, where f is the focal length of the microlenses. Radiance cameras in which the distance of the microlens array from the photosensor is adjustable, and in which other characteristics of the camera are adjustable, are described. Digital and film embodiments of the radiance camera are described. A full-resolution light-field rendering method may be applied to light-fields captured by a radiance camera to render higher-resolution output images than are possible with conventional plenoptic cameras and rendering methods.

38 Claims, 17 Drawing Sheets

U.S. PATENT DOCUMENTS

| | | | |
|---|---|---|---|
| 6,301,416 B1 | 10/2001 | Okano et al. | |
| 6,339,506 B1 | 1/2002 | Wakelin et al. | |
| 6,351,269 B1 | 2/2002 | Georgiev | |
| 6,476,805 B1 | 11/2002 | Shum et al. | |
| 6,738,533 B1 | 5/2004 | Shum et al. | |
| 6,838,650 B1 | 1/2005 | Toh | |
| 7,054,067 B2 | 5/2006 | Okano et al. | |
| 7,620,309 B2 | 11/2009 | Georgiev | |
| 7,732,744 B2 | 6/2010 | Utagawa | |
| 2001/0012149 A1 | 8/2001 | Lin et al. | |
| 2001/0050813 A1 | 12/2001 | Allio | |
| 2002/0140835 A1 | 10/2002 | Silverstein | |
| 2003/0231255 A1* | 12/2003 | Szajewski et al. | 348/340 |
| 2004/0114807 A1 | 6/2004 | Lelescu et al. | |
| 2004/0223214 A1 | 11/2004 | Atkinson | |
| 2005/0088714 A1 | 4/2005 | Kremen | |
| 2005/0122418 A1 | 6/2005 | Okita et al. | |
| 2008/0152215 A1 | 6/2008 | Horie et al. | |
| 2008/0165270 A1* | 7/2008 | Watanabe et al. | 348/340 |
| 2008/0193026 A1 | 8/2008 | Horie et al. | |
| 2009/0041381 A1 | 2/2009 | Georgiev | |
| 2009/0041448 A1 | 2/2009 | Georgiev | |
| 2009/0140131 A1* | 6/2009 | Utagawa | 250/226 |
| 2009/0185801 A1 | 7/2009 | Georgiev et al. | |
| 2010/0026852 A1 | 2/2010 | Ng et al. | |
| 2010/0085468 A1 | 4/2010 | Park et al. | |

FOREIGN PATENT DOCUMENTS

| | | |
|---|---|---|
| WO | 01/37025 | 5/2001 |
| WO | 2006/057838 | 6/2006 |
| WO | 2007/115281 | 10/2007 |

OTHER PUBLICATIONS

U.S. Appl. No. 12/474,112, filed May 28, 2009.

Adelson, T., and Wang, J., "Single lens stereo with a plenoptic camera," IEEE Transactions on Pattern Analysis and Machine Intelligence, vol. 14, issue 2, 99-106, 1992.

Borman, S., and Stevenson, R., "Super-resolution from image sequences—a review", Proceedings of the 1998 Midwest Symposium on Circuits and Systems, Publication Date: Aug. 9-12, 1998, On pp. 374-378.

Elad, M., and Feuer, A., "Restoration of a single superresolution image from several blurred, noisy, and undersampled measured images," IEEE Transactions on Image Processing Dec. 1997.

Farsiu, S., Robinson, D., Elad, M., and Milanfar, P., "Advances and challenges in super-resolution," International Journal of Imaging Systems and Technology, 2004.

Georgiev, T., Zheng, K., Curless, B., Salesin, D., and et al., "Spatio-angular resolution tradeoff in integral photography," Proc. Eurographics Symposium on Rendering, 2006.

Gortler, S. J., Grzeszczuk, R., Szeliski, R., and Cohen, M. F., "The lumigraph," ACM Trans. Graph., 43-54, 1996.

Isaksen, A., McMillan, L., and Gortler, S. J., "Dynamically reparameterized light fields," ACM Trans. Graph., 297-306, 2000.

Levoy, M., and Hanrahan, P., Light field rendering, ACM Trans. Graph., 31-42, 1996.

Ng, R., Levoy, M., Brdif, M., Duval, G., Horowitz, M., and Hanrahan, P., "Light field photography with a hand-held plenoptic camera," 2005.

Ng, R., "Fourier slice photography," International Conference on Computer Graphics and Interactive Techniques Proceedings of ACM SIGGRAPH 2005.

Park, S., Park, M., and Kang, M., "Super-resolution image reconstruction: a technical overview," Signal Processing Magazine, 2003.

Veeraraghavan, A., Mohan, A., Agrawal, A., Raskar, R., and Tumbline, J., "Dappled photography: Mask enhanced cameras for heterodyned light fields and coded aperture refocusing," ACM Trans. Graph. 26, 3, 69, 2007.

Levoy, Mark, "Optical Recipes for Light Microscopes," Stanford Computer Grpahics Laboratory Technical Memo 2006-001, Jun. 20, 2006, 10 pages.

Levoy, Mark et al., "Light Field Microscopy," Stanford University, Submitted to Siggraph 2006, 5 pages.

David E. Roberts, History of Lenticular and Related Autostereoscopic Methods, 2003, 17 pages.

Georgiev T., Wainer M.: "Morphing Between Multiple Images," Tech. Rep. (1997).

Fife K., Gamal A. E., Wong H.-S. P.: A 3mpixel multi-aperture image sensor with 0.7um pixels in 0.11um cmos. In IEEE ISSCC Digest of Technical Papers (Feb. 2008), pp. 48-49.

Xiao J., Shah M.: "Tri-view Morphing," Computer Vision and Image Understanding 96, 3 (2004), 345-366.

Lippmann G.: "Epreuves reversible donnant la sensation du relief ("Reversible Prints Providing the Sensation of Depth")", Journal of Physics 7 (1908), pp. 821-825.

Lippmann G.: "Epreuves Reversibles Photographies Integrales," Academie des sciences (Mar. 1908), pp. 446-451.

Lee S., Wolberg G., Shin S.: "Polymorph: Morphing Among Multiple Images," IEEE Computer Graphics and Applications (1998).

Zaharia, R., et al., "Adaptive 3D-DCT Compression Algorithm for Continuous Parallax 3D Integral Imaging," Signal Processing, Image Communication, Elsevier Scient Publishers, Amsterdam, NL, vol. 17, No. 3, Mar. 1, 2002, 12 pages.

Lumsdaine A., Georgiev T.: Full Resolution Lightfield Rendering. Tech. rep., Adobe Systems, Jan. 2008, 12 pages.

Naemura T., Yoshida T., Harashima H.: "3d Computer Graphics Based on Integral Photography," Optics Express, vol. 2 (2001).

Zitnick C. L., Jojic N., Kang S.: "Consistent Segmentation for Optical Flow Estimation" in Proceedings of IEEE International Conference on Computer Vision (ICCV) (2005).

Seitz S. M., Dyer C. R.: "View Morphing," ACM Trans. Graph. (1996), 21-30.

Stevens R., Harvey T.: "Lens Arrays for a Three-dimensional Imaging System," Journal of Optics A, vol. 4 (2002).

Stewart J., Yu J., Gortler S. J., McMillan L.: "A New Reconstruction Filter for Undersampled Light Field," Eurographics Symposium on Rendering (2003), 150-156.

Vaish V., Wilburn B., Joshi N., Levoy M.: "Using Plane + Parallax to Calibrate Dense Camera Arrays," In Proceedings of IEEE Conference on Computer Vision and Pattern Recognition (CVPR) (2004).

Wilburn B., Joshi N., Vaish V., Talvala E., Antunez E., Barth A., Adams A., Levoy M., Horowitz M.: "High Performance Imaging Using Large Camera Arrays," in ACM Trans. Graph. (2005).

U.S. Appl. No. 11/874,611 filed Oct. 18, 2007.

U.S. Appl. No. 12/144,411 filed Jun. 23, 2008.

U.S. Appl. No. 12/186,396, filed Jun. 23, 2008.

Shree K. Nayar, Vlad Branzoi, Terry E. Boult, "Programmable Imaging using a Digital Micromirror Array", Shree K. Nayar, Vlad Branzoi, Terry E. Boult, in Conf. on Computer Vision and Pattern Recognition, pp. I: 436-443, 2004.

Dana Dudley, Walter Duncan, John Slaughter, "Emerging Digital Micromirror Device (DMD) Applications", DLPTM Products New Applications, Texas Instruments, Inc., Copyright 2003 Society of Photo-Optical Instrumentation Engineers., This paper was published in SPIE Proceedings vol. 4985, 12 pages.

Schultz R.: Super-resolution enhancement of native digital video versus digitized NTSC sequences. In Proceedings of the Fifth IEEE Southwest Symposium on Image Analysis and Interpretation (2002), pp. 193-197.

Levoy et al. "Recording and controlling the 4D light field in a microscope using microlens arrays", Journal of Microscopy, 2009, 19 pages.

Georgiev T., Lumsdaine A.: Depth of field in plenoptic cameras. In Eurographics 2009—Annex (Apr. 2009), pp. 5-8.

Ng M. K., Bose N. K.: Mathematical analysis of super-resolution methodology. Signal Processing Magazine, IEEE 20, 3 (2003), 62-74.

Lumsdaine A., Georgiev T.: The focused plenoptic camera. In International Conference on Computational Photography (Apr. 2009), 8 pages.

Baker S., Kanade T.: Limits on superresolution and how to break them. IEEE Transactions on Pattern Analysis and Machine Intelligence (Jan. 2002), 377 pages.

Yang, J C, et al., "A Real-Time Distributed Light Field Camera," Rendering Techniques 2002, Eurographics Workshop Proceedings, PIS, Italy, Jun. 26-28, 2002, 9 pages.

Bishop T. E., Zanetti S., Favaro P.: Light field superresolution. In International Conference on Computational Photography (Apr. 16-17, 2009), 4 pages.

M. Levoy, "Light Fields and computational Imaging," Computer [Online], vol. 39, No. 8, Aug. 2006, pp. 46-55, XP002501300.

Levoy M., Hanrahan P.: "Light Field Rendering," ACM Trans. Graph. (1996), 31-42.

J. Chai, S. Chan, H. Shum, and X. Tong: "Plenoptic Sampling", ACM Trans. Graph., pp. 307-318, 2000.

F. Durand, N. Holzschuch, C. Soler, E. Chan and F. Sillion: "A frequency Analysis of Light Transport," ACM Trans. Graph., pp. 1115-1126, 2005.

Todor Georgiev and Chintan Intwala: "Light Field Camera Design for Integral View Photography," Adobe Tech. Rep., 2006, 13 pages.

J. Neumann, et al., "Eyes from Eyes Analysis of Camera Design Using Plenoptic Video Geometry," Dec. 2001, 20 pages, XP002509893.

Zhang, et al., "A Survey on Image-based Rendering-Representation, Sampling and Compression," Signal Processing, Image Communication, Elsevier Science Publishers, vol. 19, No. 1, Jan. 1, 2004, 28 pages.

Heung-Yeung Shum, et al., "Survey of Image-Based Representations and Compression Techniques," IEEE Transactions on Circuits and Systems for Video Technology, IEEE Service Center, vol. 13, No. 11, Nov. 1, 2003, 18 pages.

Shing-Chow, Chan, et al., "The Compression of Simplified Dynamic Light Fields," Proceedings of International Conference on Acoustics, Speech and Signal Processing, Apr. 6-10, 2003 Hong Kong, vol. 3, Apr. 6, 2003, 4 pages.

Ulrich, Fecker, et al., "Transposed Picture Ordering for Dynamic Light Field Coding," Joint Video Team (JVT) of ISO/ IEC MPEG & ITU-T VGEG (ISO/IEC JTC1/SC29/WG11 and ITU-T SG16 Q6), Jul. 9, 2004, 8 pages.

Grzeszczuk, R., et al., "Standard Support for 1-13 Progressive Encoding, Compression and Interactive Visualization of Surface Light Fields," Joint Video Tem (JVT) of ISO/IEC MPEG & ITU-T VGEG (ISO/IEC JTC1/SC29/WG11 and ITU-T SG16 Q6), Nov. 21, 2001, 11 pages.

Chang, et al., "Light Field Compression Using Disparity-Compensated Lifting and Shape Adaptation," IEEE Transactions on Image Processing, vol. 15, No. 4, Apr. 2006, pp. 793-806.

Sebe, et al., "Mutli-View Geometry Estimation for Light Field Compression," VMV 2002, 8 pages.

Borman, S., and Stevenson, R., "Super-resolution from image sequences—a review", Proceedings of the 1998 Midwest Symposium on Circuits and Systems, Publication Date: Aug. 9-12, 1998, On pp. 374-378.

Levin A., Fergus R., Durand F., Freeman W.: Image and depth from a conventional camera with a coded aperture. ACM Transactions on Graphics, SIGGRAPH 2007 Conference Proceedings, San Diego, CA (2007), 10 pages.

Lin Z., Shum H.: Fundamental limits of reconstruction-based super-resolution algorithms under local translation. IEEE Transactions on Pattern Analysis and Machine Intelligence 26, 1 (Jan. 2004), 83-97.

\* cited by examiner

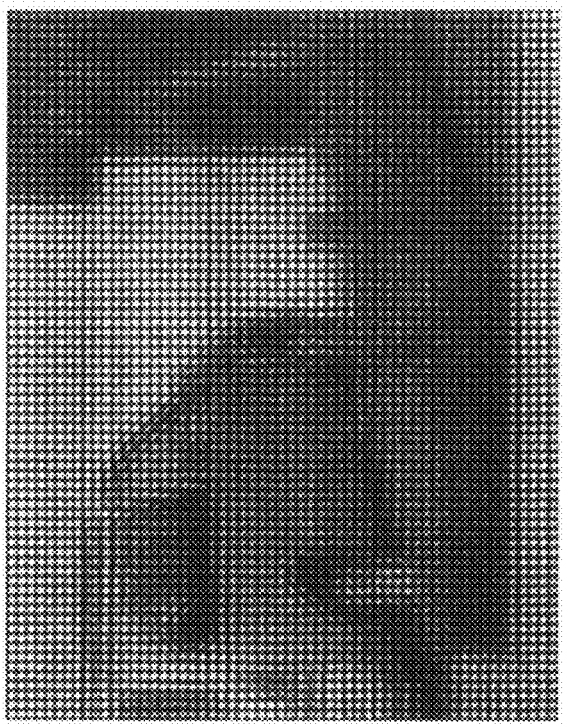
*Figure 5A*
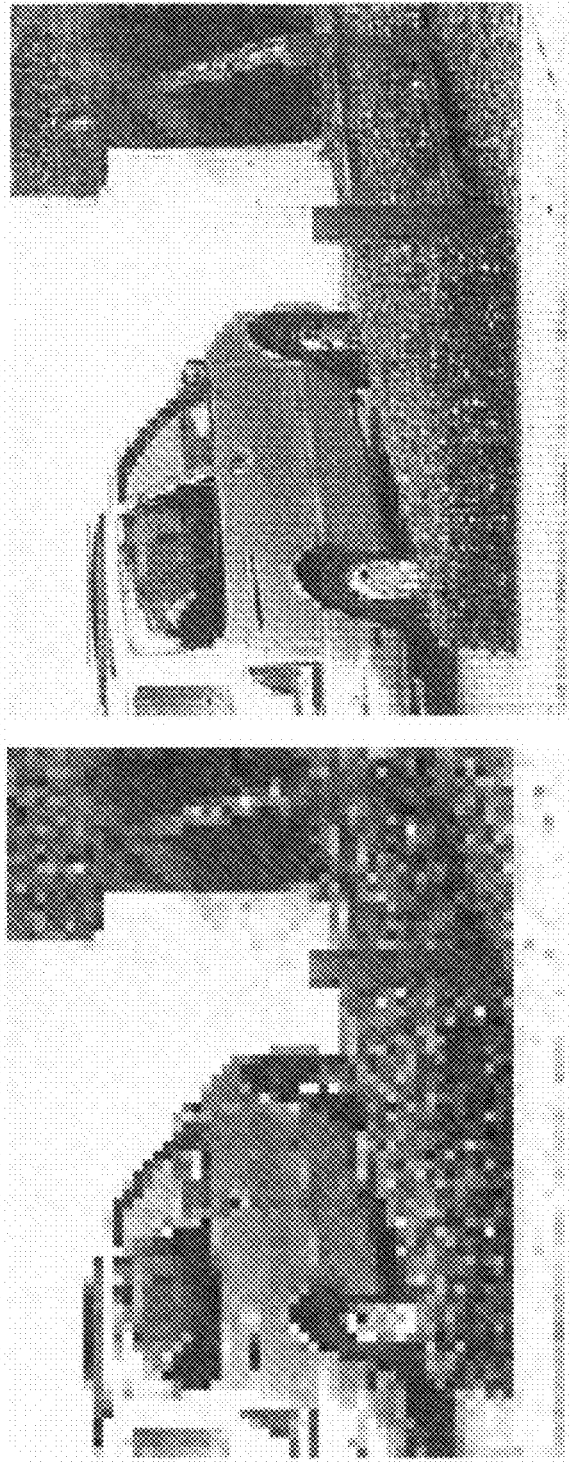
*Figure 5B*
*Figure 5C*

(Telescopic case)

*(Binocular case)*

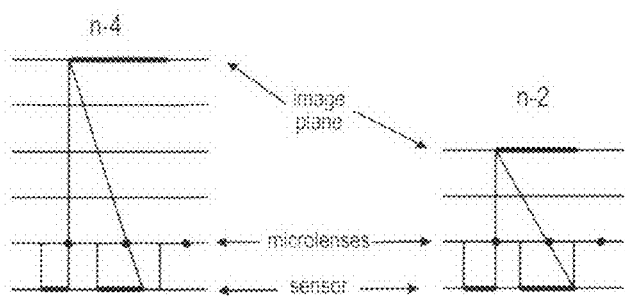
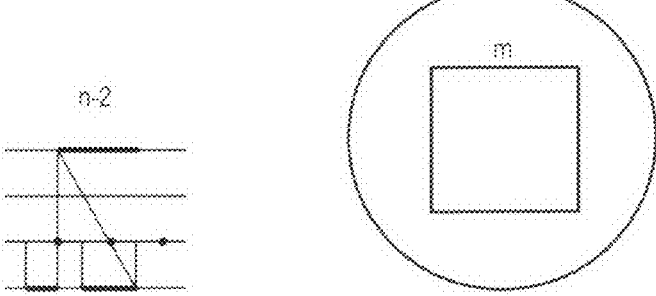
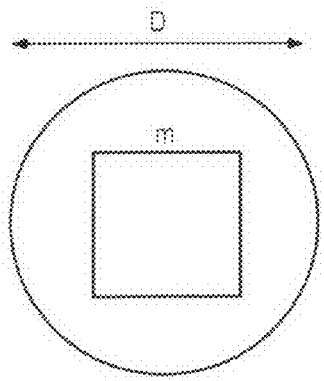
Figure 14a   Figure 14b   Figure 15
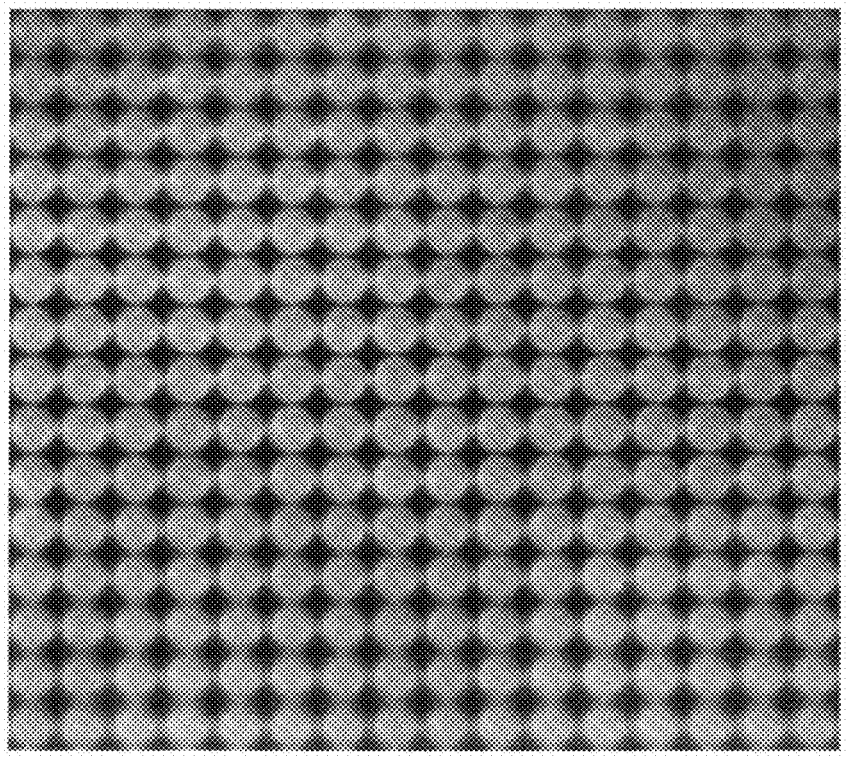
Figure 16

METHODS AND APPARATUS FOR FULL-RESOLUTION LIGHT-FIELD CAPTURE AND RENDERING

PRIORITY INFORMATION

This application claims benefit of priority of U.S. Provisional Application Ser. No. 61/023,036 entitled "Full-resolution Lightfield Rendering" filed Jan. 23, 2008, the content of which is incorporated by reference herein in its entirety.

BACKGROUND

Description of the Related Art

In a conventional camera, the main lens maps the 3D world of the scene outside camera into a 3D world inside camera. FIG. 1 illustrates imaging in a conventional camera. "Inside world" represents inside the camera. The shaded oval regions represent the order of depths in the outside world, and the corresponding depths inside the camera. One particular image plane inside the camera is shown. The mapping of the 3D world of the scene outside camera into a 3D world inside camera is governed by the lens equation:

$$\frac{1}{A} + \frac{1}{B} = \frac{1}{F}$$

where A and B are respectively the distances from the lens to the object plane and from the lens to the image plane. This equation is normally used to describe the effect of a single image mapping between two fixed planes. In reality, however, the lens equation describes an infinite number of mappings—it constrains the relationship between, but does not fix, the values of the distances A and B. That is, every plane in the outside scene (which is described as being at some distance A from the objective lens) is mapped by the objective lens to a corresponding plane inside of the camera at a distance B. When a sensor (e.g., conventional film, a charge-coupled device (CCD), etc.) is placed at a distance B between F and ∞ (infinity) inside the camera, the sensor captures an in-focus image of the corresponding plane at A that was mapped from the scene in front of the lens.

Conventional cameras render a three-dimensional scene onto a two-dimensional sensor. During operation, a conventional digital camera captures a two-dimensional (2-D) image representing a total amount of light that strikes each point on a photosensor within the camera. However, this 2-D image contains no information about the direction of the light that strikes the photosensor. The image captured by a conventional camera essentially integrates the radiance function over its angular portion, resulting in a two-dimensional intensity as a function of position. The angular information of the original radiance is lost. Thus, conventional cameras fail to capture a large amount of optical information.

Light-Field or Radiance Capturing Cameras

In contrast to conventional cameras, light-field, or radiance capturing, cameras sample the four-dimensional (4-D) optical phase space or light-field, and in doing so capture information about the directional distribution of the light rays. This information captured by light-field cameras may be referred to as the light-field, the plenoptic function, or radiance. In computational photography, a light-field is a 4-D record of all light rays in 3-D. Radiance describes both spatial and angular information, and is defined as density of energy per unit of area per unit of stereo angle (in radians). A light-field camera captures radiance; therefore, light-field images originally taken out-of-focus may be refocused, noise may be reduced, viewpoints may be changed, and other light-field effects may be achieved.

Light-fields, i.e. radiance, may be captured with a conventional camera. In one conventional method, M×N images of a scene may be captured from different positions with a conventional camera. If, for example, 8×8 images are captured from 64 different positions, 64 images are produced. The pixel from each position (i, j) in each image are taken and placed into blocks, to generate 64 blocks. FIG. 2 illustrates an exemplary prior art light-field camera, or camera array, which employs an array of two or more objective lenses 110. Each objective lens focuses on a particular region of photosensor 108, or alternatively on a separate photosensor 108. This light-field camera 100 may be viewed as a combination of two or more conventional cameras that each simultaneously records an image of a subject on a particular region of photosensor 108 or alternatively on a particular photosensor 108. The captured images may then be combined to form one image.

FIG. 3 illustrates an exemplary prior art plenoptic camera, another type of radiance capturing camera, that employs a single objective lens and a microlens or lenslet array 106 that includes, for example, about 100,000 lenslets. In a conventional plenoptic camera 102, lenslet array 106 is fixed at a small distance (~0.5 mm) from a photosensor 108, e.g. a charge-coupled device (CCD). In conventional plenoptic cameras, the microlenses are placed and adjusted accurately to be exactly at one focal length f from the sensor 108. This is done by placing the array of microlenses at distance f from the sensor, where f is the focal length of the microlenses. Another way to say this is that, for the microlenses, f is chosen to be equal to the distance to the photosensor 108. In other words, the microlenses are focused on infinity, which is essentially equivalent to focusing the microlenses on the main lens 104, given the large distance of the microlenses to the main lens relative to the focal length of the microlenses. Thus, the raw image captured with plenoptic camera 102 is made up of an array of small images, typically circular, of the main lens 108. These small images may be referred to as microimages. However, in conventional plenoptic camera 102, each microlens does not create an image of the internal world on the sensor 108, but instead creates an image of the main camera lens 104.

The lenslet array 106 enables the plenoptic camera 102 to capture the light-field, i.e. to record not only image intensity, but also the distribution of intensity in different directions at each point. Each lenslet splits a beam coming to it from the main lens 104 into rays coming from different locations on the aperture of the main lens 108. Each of these rays is recorded as a pixel on photosensor 108, and the pixels under each lenslet collectively form an n-pixel image. This n-pixel area under each lenslet may be referred to as a macropixel, and the camera 102 generates a microimage at each macropixel. The plenoptic photograph captured by a camera 102 with, for example, 100,000 lenslets will contain 100,000 macropixels, and thus generate 100,000 microimages of a subject. Each macropixel contains different angular samples of the light rays coming to a given microlens. Each macropixel contributes to only one pixel in the different angular views of the scene; that is, only one pixel from a macropixel is used in a given angular view. As a result, each angular view contains 100,000 pixels, each pixel contributed from a different macropixel. Another type of integral or light-field camera is similar to the plenoptic camera of FIG. 3, except that an array of pinholes is used between the main lens and the photosensor instead of an array of lenslets.

FIG. 4 further illustrates an exemplary prior art plenoptic camera model. In conventional plenoptic camera 102, the microlens-space system swaps positional and angular coordinates of the radiance at the microlens. For clarity, only the rays through one of the microlenses are illustrated. The conventional optical analysis of such a plenoptic camera considers it as a cascade of a main lens system followed by a microlens system. The basic operation of the cascade system is as follows. Rays focused by the main lens 104 are separated by the microlenses 106 and captured on the sensor 108. At their point of intersection, the rays have the same position but different slopes. This difference in slopes causes the separation of the rays when they pass through a microlens-space system. In more detail, each microlens functions to swap the positional and angular coordinates of the radiance, then this new positional information is captured by the sensor 108. Because of the swap, it represents the angular information at the microlens. As a result, each microlens image captured by sensor 108 represents the angular information for the radiance at the position of the optical axis of the corresponding microlens.

The light-field is the radiance density function describing the flow of energy along all rays in three-dimensional (3D) space. Since the description of a ray's position and orientation requires four parameters (e.g., two-dimensional positional information and two-dimensional angular information), the radiance is a four-dimensional (4D) function. This function may be referred to as the plenoptic function. Image sensor technology, on the other hand, is only two-dimensional, and light-field imagery must therefore be captured and represented in flat (two dimensional) form. A variety of techniques have been developed to transform and capture the 4D radiance in a manner compatible with 2D sensor technology. This may be referred to as flat or light-field representation of the 4D radiance.

To accommodate the extra degrees of dimensionality, extremely high sensor resolution is required to capture flat radiance. Even so, images are rendered from a flat at a much lower resolution than that of the sensor, i.e., at the resolution of the radiance's positional coordinates. If the angular information is finely sampled, then an large number of pixels from the flat light-field imagery are being used to create just one pixel in the rendered image. Each microlens determines only one pixel in the rendered image; when the angular information under one microlens is integrated, only one pixel is determined in the rendered image. The rendered image may thus have a resolution that is orders of magnitude smaller than the raw flat light-field imagery itself. For example, in an exemplary conventional light-field camera, a "flat" may be represented in 2D with a 24,862×21,818 pixel array. The 4D radiance that is represented may, for example, be 408×358× 61×61. With existing rendering techniques, images are rendered from this radiance at 408×358, i.e., 0.146 megapixel. Not only is this a disappointingly modest resolution (any cell phone today will have better resolution), any particular rendered view only uses one out of every 3,720 pixels from the flat imagery. The large disparity between the resolution of the flat and the rendered images is extraordinarily wasteful for photographers who are ultimately interested in taking photographs rather than capturing flat representations of the radiance.

SUMMARY

Various embodiments of a method and apparatus for full-resolution light-field capture and rendering are described.

Embodiments of a full-resolution radiance camera, and of a method for rendering high-resolution images from flat light-field imagery captured by embodiments of the full-resolution radiance camera, are described. Images rendered from the light-field using conventional light-field cameras and conventional light-field rendering methods are at significantly low resolutions. Embodiments of the full-resolution radiance camera and of the full-resolution light-field rendering method more adequately meet the resolution and image size expectations of modern photography than do conventional light-field cameras and rendering methods.

In embodiments of the radiance camera, the microlenses are focused on an image created by the main lens (the image plane of the main lens) within the camera, instead of being focused on the main lens itself, as in conventional plenoptic cameras. This serves to increase or maximize spatial resolution, and to thus achieve sharper, higher spatial resolution microlens images. In the image plane, there is a real image of a scene in front of the camera and refracted by the main lens to the image plane, but there is nothing there physically (other than light); the image plane is simply a plane location in space that can be considered to have an image "in the air" as created by the main lens. The microlenses, being focused on the image plane instead of on the main lens, can capture the image of the scene at the image plane. Each microlens captures a small area or region of the image at the image plane and maps or projects the captured region onto a corresponding region of the photosensor. The imaging property of the radiance camera may be viewed as two steps; from the world through the main lens to the image plane, and then from the image plane through the microlenses to the photosensor. This is similar to a cascade of two cameras, but the second camera is actually many small cameras, as each microlens is effectively a little camera that captures a small image from the image plane. In further contrast to conventional plenoptic cameras, the microlenses in embodiments of the radiance camera may be located at, or may be moved to, distances greater than f or less than f from the photosensor, where f is the focal length of the microlenses. In an exemplary embodiment, the array of microlenses may be placed at distance 4/3 f from the photosensor. Other embodiments may place the array of microlenses at other distances, greater than or less than f, from the photosensor. In addition, embodiments of radiance cameras in which the distance of the microlens array from the photosensor is variable or adjustable, and in which other characteristics of the camera may be adjustable, are described. Various embodiments of the full-resolution radiance camera implemented in digital cameras and in film cameras are anticipated, and exemplary embodiments of both types are described.

In an embodiment of a full-resolution light-field rendering method, a flat light-field image captured by a radiance camera may be obtained. Microimages in areas of the light-field image may be examined to determine the direction of movement of edges in the microimages relative to a direction of movement. If it is determined that edges in microimages of an area are moving relative to the microimage centers in the same direction as the direction of movement, the microimages in that area may be inverted relative to their individual centers. The microimages may each be cropped to produce an m×m subregion or crop of each microimage, where m is an integer greater than two. The subregions or crops from the microimages may then be appropriately assembled to produce a final high-resolution image of the scene.

By focusing the microlenses on the image produced by the main lens, embodiments of the radiance camera are able to fully capture the positional information of the light-field. Embodiments of the full-resolution light-field rendering method may be used to render full-resolution images from light-field images captured by embodiments of the radiance camera, producing output images at a dramatically higher resolution than conventional light-field rendering techniques. Embodiments may render images at spatial resolutions that meet the expectations of modern photography (e.g., 10 megapixel and beyond), making light-field photography much more practical.

BRIEF DESCRIPTION OF THE DRAWINGS

FIG. 5A shows a raw light-field image as captured by a plenoptic camera.

FIG. 5B shows a final image rendered from the light-field image of FIG. 5A according to a conventional rendering method.

FIG. 5C shows a final image rendered from the light-field image of FIG. 5A according to an embodiment of the full-resolution light-field rendering method.

FIG. 14A shows the ray geometry in the telescopic case for n=4.

FIG. 14B shows the ray geometry in the telescopic case for n=2.

FIG. 15 illustrates a lens circle (or microimage) of diameter D and a patch or crop of size m, where m is an integer greater than or equal to 2.

FIG. 16 shows a zoom into an exemplary microlens array.

Figure 1:
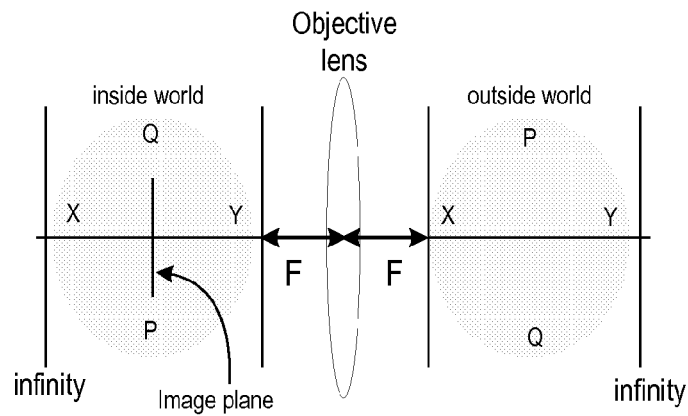
FIG. 1 illustrates imaging in a conventional camera.
Figure 2:
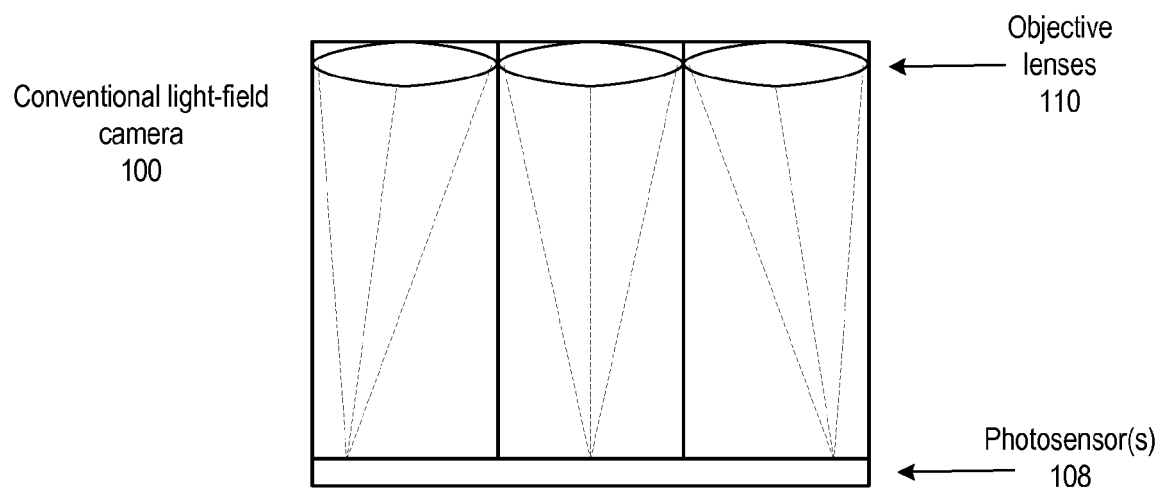
FIG. 2 illustrates an exemplary prior art light-field camera, or camera array, which employs an array of two or more objective lenses.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for full-resolution light-field capture and rendering are described. Embodiments of a full-resolution radiance camera, and of a method for rendering high-resolution images from flat light-field imagery captured by embodiments of the full-resolution radiance camera, are described. The method for rendering high-resolution images from flat light-field imagery captured by embodiments of the full-resolution radiance camera may be referred to as a full-resolution light-field rendering method, or simply as the light-field rendering method. For simplicity, the full-resolution radiance camera may be referred to as a radiance camera.

Light-field photography enables many new possibilities for digital imaging because it captures both spatial and angular information, i.e., the full four-dimensional radiance, of a scene. High-resolution is required in order to capture four-dimensional data with a two-dimensional sensor. However, images rendered from this data as projections of the four-dimensional radiance onto two spatial dimensions using conventional light-field cameras and conventional light-field rendering methods are at significantly lower resolutions. Embodiments of the full-resolution radiance camera and of the full-resolution light-field rendering method more adequately meet the resolution and image size expectations of modern photography than do conventional light-field cameras and rendering methods.

In embodiments of the full-resolution radiance camera, the microlenses in the microlens array are focused on the image plane of the main camera lens, rather than on the main camera lens itself as in conventional plenoptic cameras. In the image plane, there is a real image of a scene in front of the camera and refracted by the main lens to the image plane, but there is nothing there physically (other than light); the image plane is simply a plane location in space that can be considered to have an image "in the air" as created by the main lens. The microlenses, being focused on the image plane instead of on the main lens, can capture the image of the scene at the image plane. Each microlens captures a small area or region of the image at the image plane and maps or projects the captured region onto a corresponding region of the photosensor. The imaging property of the radiance camera may be viewed as two steps; from the world through the main lens to the image plane, and then from the image plane through the microlenses to the photosensor. This is similar to a cascade of two cameras, but the second camera is actually many small cameras, as each microlens is effectively a little camera that captures a small image from the image plane. This is also similar to the way a telescope operates. By focusing the microlenses on the image produced by the main lens, embodiments of the radiance camera are able to fully capture the positional information of the radiance. Embodiments of the full-resolution light-field rendering method may be used to render full-resolution images from light-field images captured by embodiments of the radiance camera, producing output images at a dramatically higher resolution than conventional light-field rendering techniques. Embodiments may render images at spatial resolutions that meet the expectations of modern photography (e.g., 10 megapixel and beyond), making light-field photography much more practical.

An analysis of light-field camera structure and optics is given below that provides insight on the interactions between the main lens system and the microlens array in light-field cameras. Based on results of this analysis, embodiments exploit the fact that, at every plane of depth, the radiance contains a considerable amount of positional information about the scene, encoded in the angular information at that plane. Accordingly, embodiments may be referred to as full-resolution because embodiments make full use of both angular and positional information that is available in the four-dimensional radiance, as shown in the analysis. In contrast to super-resolution techniques, which create high-resolution images from sub-pixel shifted low-resolution images, embodiments render high-resolution images directly from the radiance data. Moreover, embodiments may generate light-field images that are amenable to radiance processing techniques such as Fourier slice refocusing.

FIGS. 5A through 5C show, for comparison, results from a conventional plenoptic camera and rendering method and results from exemplary embodiments of a full-resolution radiance camera and full-resolution light-field rendering method as described herein. FIG. 5A shows a raw light-field image as captured by a plenoptic camera. Note that, to the untrained human eye, the raw light-field image captured by a conventional plenoptic camera may look similar to the raw light-field image captured by an embodiment of the full-resolution radiance camera. FIG. 5B shows a conventionally rendered final image, and FIG. 5C shows a final image rendered according to an embodiment of the full-resolution light-field rendering method as described herein. Even in this small, grayscale format, a drastic improvement in spatial resolution in FIG. 5C when compared to the spatial resolution in FIG. 5B is easily observable.

Full-Resolution Radiance Cameras

Figure 3:
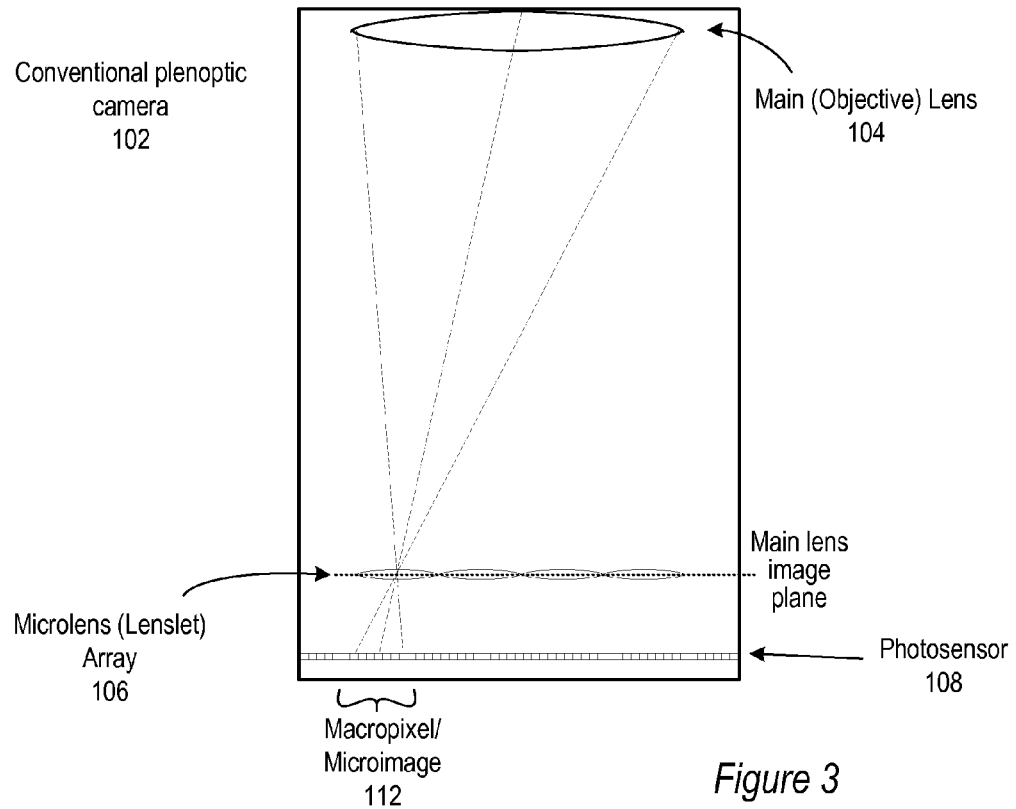
FIG. 3 illustrates an exemplary prior art plenoptic camera that employs a single objective lens and a microlens array.
Figure 4:
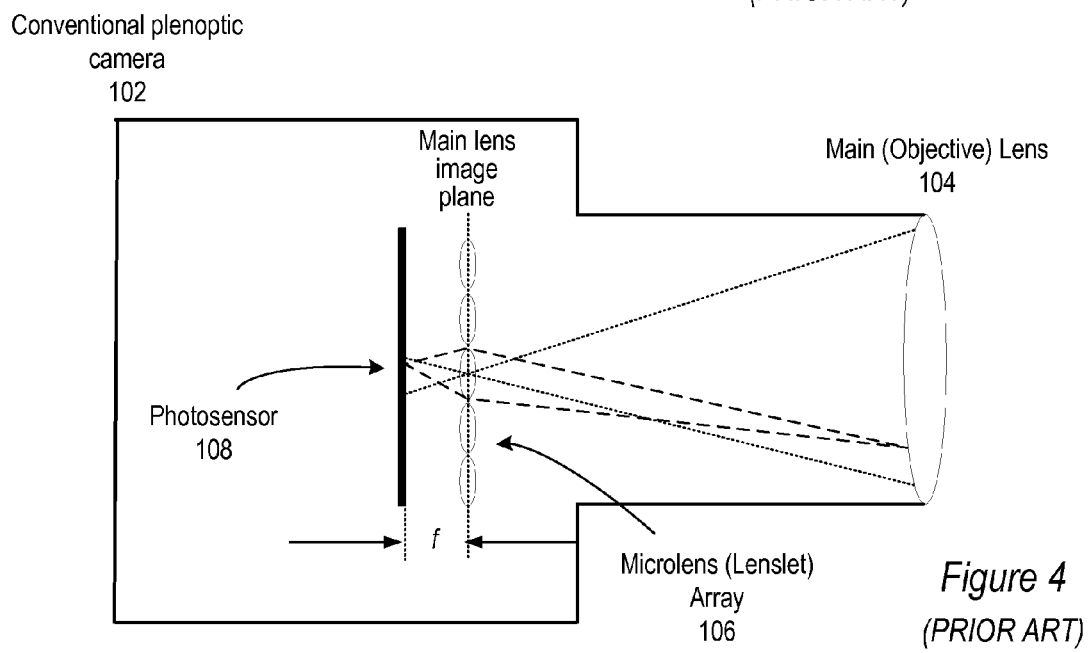
FIG. 4 further illustrates an exemplary prior art plenoptic camera.

Various embodiments of a full-resolution radiance camera are described. In conventional plenoptic cameras such as those illustrated in FIGS. 3 and 4, the microlenses are placed and adjusted accurately to be exactly at one focal length f from the photosensor, where f is the focal length of the microlenses. In addition, in conventional plenoptic cameras, the microlens array is fixed at the image plane of the main or objective lens of the camera, and the microlenses in the array are focused at infinity. In contrast, in embodiments of the radiance camera described herein, in order to increase or maximize spatial resolution, i.e., to achieve sharper, higher spatial resolution, microlens images, the microlenses are focused on the image created by the main lens inside the camera and in front of the microlenses (the image plane of the main lens), instead of being focused on the main lens itself, as in conventional plenoptic cameras. In further contrast to conventional plenoptic cameras, the microlenses in embodiments of the radiance camera described herein may be located at, or may be moved to, distances greater than f or less than f from the photosensor, where f is the focal length of the microlenses. In one embodiment, the array of microlenses may be placed at distance $\frac{4}{3}$ f from the photosensor. Other embodiments may place the array of microlenses at other distances that are multiples of f, e.g. 1.5 f or $\frac{3}{4}$ f. In addition, embodiments of radiance cameras in which the distance of the microlens array from the photosensor is variable or adjustable, and in which other characteristics of the camera may be adjustable, are described. For example, in one embodiment, the distance of the microlens array from the photosensor may be adjustable within the range 0.5 f to 1.5 f. For the telescopic case (the distance of the microlens array from the photosensor >f), a maximum useful distance may be 1.5 f, although distances greater than 1.5 f may be possible, if not practical. Thus, for the telescopic case, a practical range for the distance of the microlens array from the photosensor may be f<b≦1.5 f.

Various embodiments of the full-resolution radiance camera implemented in digital cameras and in film cameras are anticipated, and exemplary embodiments of both types are described. In digital cameras, the photosensor is a digital light-capturing device or medium such as a charge-coupled device (CCD) that captures and records the light in digital format. In film cameras, the photosensor is a film. Thus, "photosensor" as used herein refers to digital media that are used in digital cameras to capture light and to film media that are used in film cameras to capture light, and more generally to any device or medium that may be used to capture light. Light-field images captured on a film using film camera embodiments may subsequently be digitized, for example using a high-resolution scanner, so that the captured light-field may be rendered, for example using the full-resolution light-field rendering method described herein, to produce high-resolution output images. Light-field images captured using digital camera embodiments may be directly rendered.

In addition to digital and film embodiments, fixed and adjustable embodiments of both digital camera and film camera embodiments of the full-resolution radiance camera are anticipated, and exemplary embodiments of both types are described. In a fixed embodiment, the photosensor and the microlens array are at a fixed distance b from each other (the distance b is a multiple of f, for example $\frac{4}{3}$ f, $\frac{3}{4}$ f, or 1.5 f, where f is the focal length of the microlenses). Note that b is used herein to designate the distance between the microlenses and the photosensor, while a is used herein to designate the distance between the microlenses and the image plane of the main or objective lens. In some embodiments, the microlens array/photosensor combination may be fixed at a location in the camera body. In some embodiments, the microlens array may be fixed in optical characteristics as well as in its physical location. In some embodiments, the main lens of the camera may also be fixed in optical characteristics and location, while possibly allowing for changes in shutter speed, aperture, focusing, etc. In adjustable embodiments, various manual or automatic mechanisms may be employed to change the distance b between the photosensor and the microlens array, to change the location of the microlens array/photosensor combination in the camera body, to change the distance from the main lens to the microlens array, to change the distance a between the microlenses and the image plane, and/or to swap or replace various components such as the microlens array and the main lens. In addition, the main lens of the camera may be swappable to use different main lenses, and may be adjustable according to aperture, shutter speed, focusing, distance from the microlens array, and so on. Embodiments where the microlens array may be swappable, so that microlens arrays with different numbers of microlenses and/or microlenses with different optical characteristics may be used, are also possible.

The optical characteristics of the optical system, including the optical characteristics of the lenses and the distances between the various components or elements, is important in capturing light-fields that may be rendered to yield high-resolution output images as described herein. Thus, in fixed embodiments, the microlenses, main lens, photosensor, and the relative physical location of these components in the camera may be determined according to the formulas and equations described herein to capture appropriate and satisfactory light-field images. In adjustable embodiments, some embodiments may include automated mechanisms that automatically adjust the positioning or other aspects of one or more of the components to capture appropriate and satisfactory light-field images. For example, if the user adjusts or replaces one component, the camera may automatically adjust one or more other components to compensate for the change. Alternatively, a human operator of an adjustable radiance camera may manually adjust the positioning or other aspects of one or more of the components, may replace one or more components with units that have different characteristics, or may insert other components (e.g., microsheet glass, as described below) to capture appropriate and satisfactory light-field images.

Figure 6:
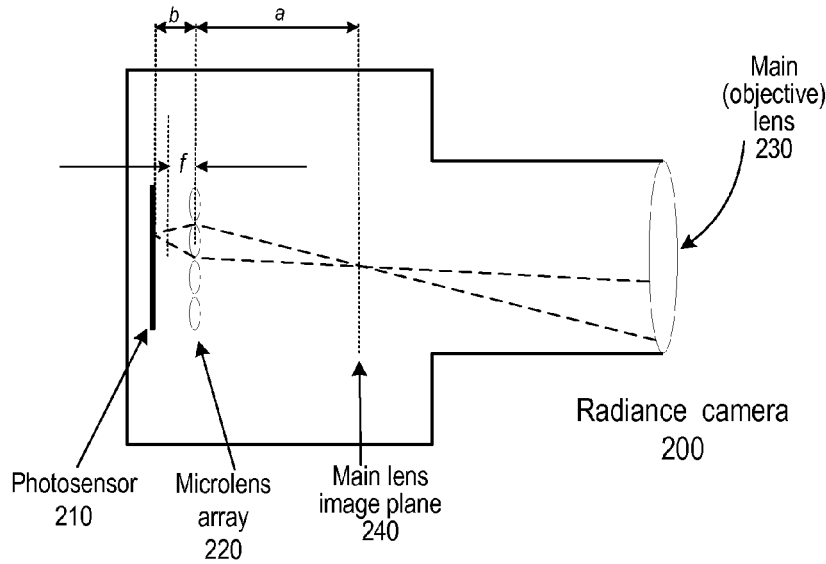
FIG. 6 is a block diagram illustrating a full-resolution radiance camera according to one embodiment.
Figure 7:
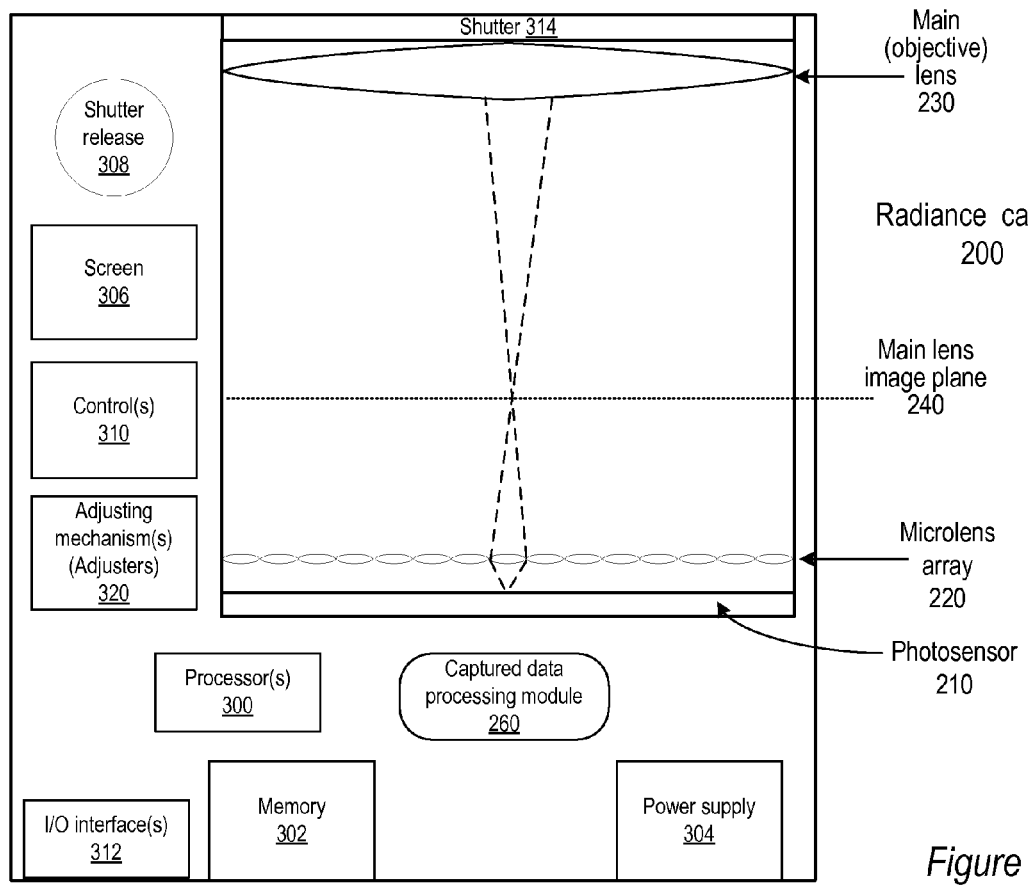
FIG. 7 illustrates an exemplary embodiment of a radiance camera with various other elements that may be integrated in the camera.
Figure 8:
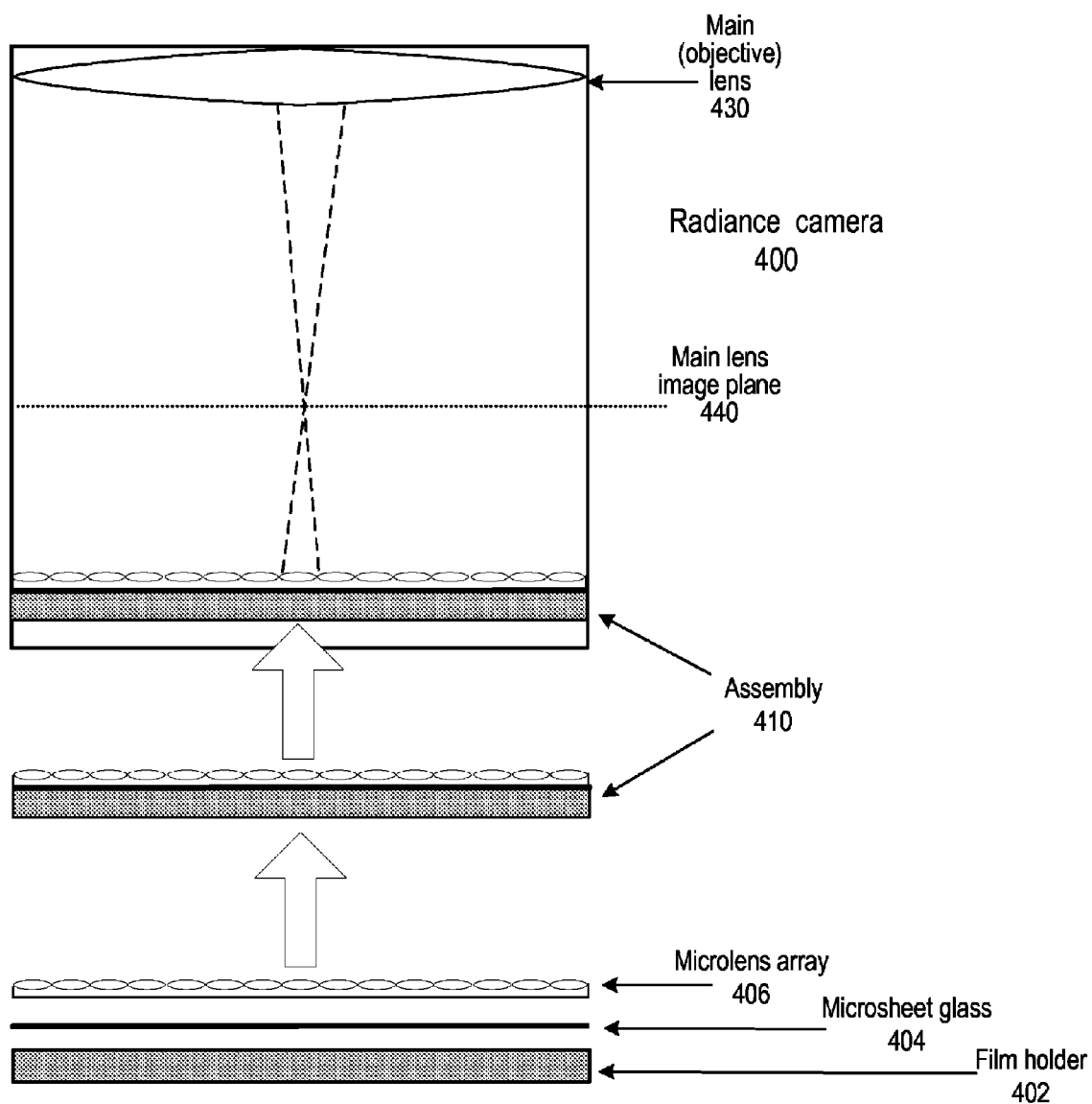
FIG. 8 illustrates an exemplary embodiment of a radiance camera 200 based on a large-format film camera.

FIGS. 6 through 8 illustrate exemplary film camera and digital camera embodiments of a radiance camera as described herein, and further illustrate both fixed and adjustable embodiments of the radiance camera. It is noted that these are exemplary embodiments, and are not intended to be limiting. Other embodiments are possible and anticipated.

FIG. 6 is a block diagram illustrating a full-resolution radiance camera according to one embodiment. Radiance camera 200 may include a main (objective) lens 230, a microlens array 220, and a photosensor 210. Microlens array 220 may be located at a distance greater than f from photosensor 210, where f is the focal length of the microlenses in array 220. In addition, the microlenses in array 220 are focused on the image plane 240 of the main lens 230. In contrast, in conventional plenoptic cameras such as plenoptic camera 102 of FIGS. 3 and 4, the microlens array 106 is fixed at distance f from photosensor 108, and the microlenses in array 106 are focused on the main lens 104. In some embodiment, photosensor 210 may be conventional film; in other embodiments, photosensor 210 may be a device for digitally capturing light, for example a CCD. In one embodiment of a microlens array 220 that may be used in embodiments of radiance camera 200, or in other embodiments as illustrated in FIGS. 7 and 8, the microlens array 220 may include 146,000 microlenses of diameter 0.25 mm and focal length 0.7 mm. Other configurations of microlens array 220, including different numbers of microlenses and/or microlenses with different optical characteristics, are possible and anticipated. FIG. 16 shows a zoom into an exemplary microlens array, and shows individual microlenses and (black) chromium mask between the microlenses.

FIG. 7 illustrates an exemplary embodiment of radiance camera 200 with various other elements that may be integrated in the camera 200. In some embodiments of radiance camera 200, the objective lens 230, the microlens array 220, and the photosensor 210 may be fixed. In other embodiments, one or more of the above elements may be replaceable and/or adjustable. In some embodiment, photosensor 210 may be conventional film; in other embodiments, photosensor 210 may be a device for digitally capturing light, for example a CCD. In general, embodiments of a radiance camera 200 as described herein may include, in addition to main lens 230, microlens array 220, and photosensor 210, any other type of elements and features commonly found in digital cameras or other cameras including light-field and plenoptic cameras and large-format film cameras, and may also include additional elements and features not generally found in conventional cameras.

Figure 24:
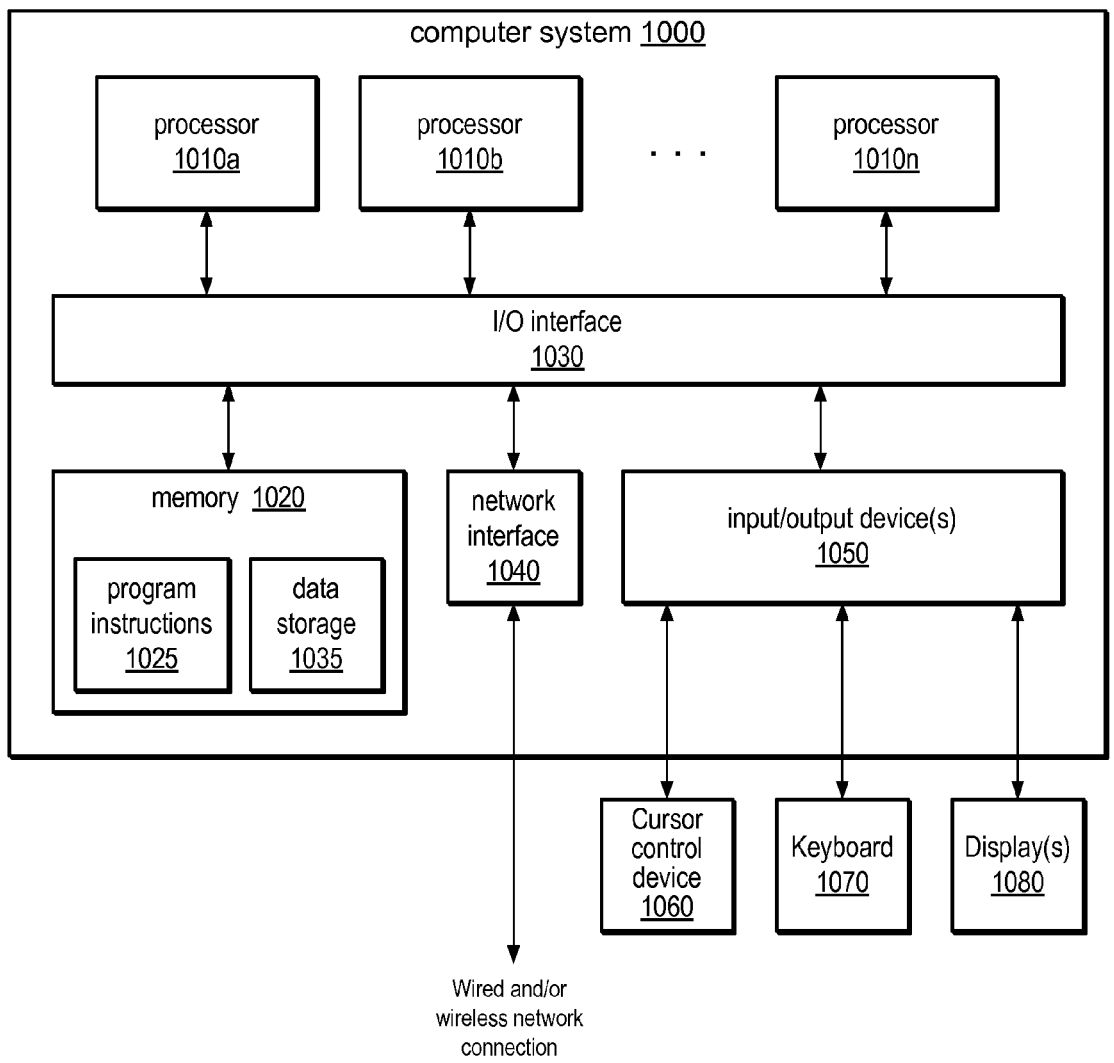
FIG. 24 illustrates an exemplary computer system that may be used in embodiments.

In one embodiment, a full-resolution light-field rendering method for rendering high-resolution images from light-fields captured by radiance camera 200, and/or other image processing algorithms for application to light-fields captured by embodiments of radiance camera 200, may be implemented in captured data processing module 260. Captured data processing module 260 may be implemented in hardware, software, or a combination thereof. Alternatively, light-fields captured by radiance camera 200 may be rendered according to the full-resolution light-field rendering method implemented in a full-resolution light-field rendering module executing on a separate device, e.g. a computer system, to generate one or more high-resolution output images of a captured scene, as described herein. An exemplary computer system in which embodiments of the full-resolution light-field rendering method may be implemented is illustrated in FIG. 24.

A radiance camera 200 may include a shutter 314. Shutter 314 may be located in front of or behind objective lens 230. A radiance camera 200 may include one or more processors 300. A radiance camera 200 may include a power supply or power source 304, such as one or more replaceable or rechargeable batteries. A radiance camera 200 may include a memory storage device or system 302 for storing captured light-field images and/or rendered final images or other information such as software. In one embodiment, the memory 302 may be a removable/swappable storage device such as a memory stick. A radiance camera 200 may include a screen 306 (e.g., an LCD screen) for viewing scenes in front of the camera prior to capture and/or for viewing previously captured and/or rendered images. The screen 306 may also be used to display one or more menus or other information to the user. A radiance camera 200 may include one or more I/O interfaces 312, such as FireWire or Universal Serial Bus (USB) interfaces, for transferring information, e.g. captured light-field images, software updates, and so on, to and from external devices such as computer systems or even other cameras. A radiance camera 200 may include a shutter release 308 that is activated to capture a light-field image of a subject or scene.

A radiance camera 200 may include one or more controls 310, for example controls for controlling optical aspects of the radiance camera 200 such as shutter speed, one or more controls for viewing and otherwise managing and manipulating captured images stored in a memory on the camera, etc. An adjustable radiance camera 200 may include one or more controls for adjusting the relative location of (the distance between) the components in the camera 200, such as the distance b between microlens array 220 and photosensor 210. An adjustable radiance camera 200 may include one or more manual or automatic adjusting mechanism(s) 320, or adjusters, configured to adjust the relative location of (the distance between) the components in the camera 200, such as the distance b between microlens array 220 and photosensor 210.

In some embodiments, the adjusting mechanisms 320 may act to adjust one or more components responsively to controls 310.

FIG. 8 illustrates an exemplary embodiment of a radiance camera 200 based on a large-format film camera. In conjunction with current high-resolution scanners used to digitize captured images from negatives or prints, large-format film camera embodiments are capable of up to 1 gigapixel, or even higher, resolution for the flat or light-field representation of the 4D radiance (the raw light-field image). An exemplary embodiment may, for example, be implemented in large-format film camera using a 135 mm objective lens 430 and 4×5 format film as the "photosensor" (in large-format cameras, single negatives of film are generally placed in a film holder 402 or cartridge that can be inserted into and removed from the camera body). Other objective lenses and/or other film formats, for example 8×10 format film, may be used in various embodiments. Radiance camera 400 includes a microlens array 406. FIG. 16 shows a zoom into an exemplary microlens array, and shows individual microlenses and (black) chromium mask between the microlenses. In one embodiment of a microlens array that may be used in embodiments of radiance camera 400, or in other embodiments as illustrated in FIGS. 6 and 7, the microlens array 406 may include 146,000 microlenses of diameter 0.25 mm and focal length 0.7 mm. Other configurations of microlens array 406, including different numbers of microlenses and/or microlenses with different optical characteristics, are possible and anticipated.

In one embodiment, a mechanism inside a film holder 402 of the large-format film camera holds the microlens array 406 so that the flat side of the glass base of the array 406 is pressed against the film. In one embodiment, the thickness of the microlens array 406 is such that, when placed against the film, the microlenses are distance f from the film. Other configurations of microlens arrays 406 are possible, and the configuration of the large-format film camera makes it possible to easily change configurations of microlenses by simply using a different microlens array 406. Microsheets 404 of glass may be used in the assembly as spacers or shims between the microlens array 406 and the film in film holder 402 to increase the distance from the microlenses and the film to be greater than f (e.g., $\frac{4}{3}$ f). An exemplary thickness of a microsheet 404 that may be used is 0.23 mm. Inserting microsheet glass 404 provides spacing in a rigorously controlled manner. In one embodiment, additional spacing may be created by adding a single microsheet 404 between the film holder 402 and the microlens array 406 in order to displace the microlenses by an additional $\frac{1}{3}$ f approximately 0.2 mm from the sensor. Additional microsheets 404 may be added to provide additional spacing. In some embodiments, other mechanisms than microsheet glass may be used as spacers between the microlens array 406 and film holder 402 to adjust the distance between the microlens array 406 and film holder 402.

As illustrated in FIG. 8, in one embodiment, the film holder 402 and microlens array 406 may be coupled to create assembly 410. One or more microsheets 404 may optionally be inserted between the film holder 402 and microlens array 406 to provide additional spacing as necessary or desired. The assembly 410 may then be inserted into the large-format film camera. The combination of the large-format film camera and the assembly 410 effectively forms a radiance camera 400. Radiance camera 400 may then be used to capture a light-field image of a scene on the film in film holder 402. The assembly 410 may then be removed from the camera 400, disassembled, and the film may be appropriately processed. The film negative and/or a print of the light-field image may then be digitized, for example using a high-resolution scanner or a device that generates digital images from negatives. The digitized light-field image may be stored to a storage device, such as a disk drive, DVD, CD, etc. The digitized light-field image may be rendered according to the full-resolution light-field rendering method, implemented in a full-resolution light-field rendering module executing on a computer system, to generate one or more high-resolution output images of the scene as described herein. An exemplary computer system in which embodiments of the full-resolution light-field rendering method may be implemented is illustrated in FIG. 24.

An analysis of the full-resolution light-field rendering methods and apparatus provided herein shows that focusing the microlenses on the image plane of the main lens in the radiance camera, rather than focusing on the main lens itself as in conventional plenoptic cameras, enables embodiments of the full-resolution light-field rendering methods and apparatus to more fully exploit positional information available in the captured flat light-field imagery (i.e., the raw light-field image captured by the light-field camera). Based on good focusing and high-resolution of the microlens images, embodiments of the described methods and apparatus are able to achieve very high-resolution of rendered images when compared to conventional plenoptic cameras and conventional rendering methods. For example, one embodiment achieves a 27× increase in resolution in each spatial dimension when compared to results from conventional plenoptic cameras and conventional rendering methods.

Full-Resolution Light-Field Rendering Method

Embodiments of a method and apparatus for rendering high-resolution images from a light-field, for example captured by embodiments of the full-resolution radiance camera, are described. The method for rendering high-resolution images from the light-field may be referred to as a full-resolution light-field rendering method. The light-field rendering method may be referred to as full-resolution because the method makes full use of both positional and angular information available in the captured radiance data. The full-resolution light-field rendering method may be implemented as or in a tool, module, library function, plug-in, stand-alone application, etc. For simplicity, implementations of embodiments of the full-resolution light-field rendering method may referred to as a full-resolution light-field rendering module. Alternatively, or in addition, other light-field rendering or processing techniques may be applied to captured light-field images by a full-resolution light-field rendering module, and/or by other modules. FIG. 24 illustrates an exemplary computer system on which embodiments of a full-resolution light-field rendering module may be implemented.

A description of the full-resolution light-field rendering method and an analysis of the limits and tradeoffs of the method are presented. The effectiveness of the full-resolution light-field rendering method when compared to conventional methods may be demonstrated experimentally by rendering images from a 542-megapixel light-field using a conventional rendering approach and using the full-resolution light-field rendering method described herein. In the experiments, the conventional rendering methods produce a 0.146-megapixel final image, while the full-resolution light-field rendering method produces a 106-megapixel final image. Experimental results show that our method may produce full-resolution images that approach the resolution that would have been captured directly with a conventional (non-light-field) high-resolution camera.

Plenoptic Camera Modes of Behavior

The full-resolution light-field rendering method may be derived by analyzing the optical system of the plenoptic camera. First, some observations of captured light-field imagery are presented, and these observations are used to motivate the subsequent analysis.

Figure 9:
FIG. 9 shows an example crop from a raw light-field image acquired with a plenoptic camera.

FIG. 9 shows an example crop from a raw light-field image acquired with a plenoptic camera. In FIG. 9, repeated edges inside multiple circles may be observed. Each microlens in the microlens array creates a microimage; the resulting light-field imagery is thus an array of microimages. On a large scale, the overall image may be perceived, whereas the correspondence between the individual microlens images and the large scale scene is less obvious. Interestingly, as will be shown, it is this relationship—between what is captured by the microlenses and what is in the overall scene—that may be exploited in embodiments to create high-resolution images.

In FIG. 9, on a small scale, a number of clearly distinguishable features inside the circles, such as edges, may be observed. Edges are often repeated from one circle to the next. The same edge (or feature) may be seen in multiple circles, in a slightly different position that shifts from circle to circle. If the main camera lens is manually refocused, a given edge can be made to move and, in fact, change its multiplicity across a different number of consecutive circles.

Repetition of features across microlenses is an indication that that part of the scene is out of focus. When an object from the large-scale scene is in focus, the same feature appears only once in the array of microimages.

In interpreting the microimages, it is important to note that, as with the basic conventional camera described above, the operation of a basic plenoptic camera is far richer than a simple mapping of the radiance function at some plane in front of the main lens onto the sensor. That is, there are an essentially infinite number of mappings from the scene in front of the lens onto the image sensor. For one particular distance, this corresponds to a mapping of the radiance function. What the correspondence is for parts of the scene at other distances—as well as how they manifest themselves at the sensor—is less obvious. This will be the topic of the remaining part of this section.

Next, two limiting cases are considered which can be recognized in the behavior of the plenoptic camera: Telescopic (where the distance between the photosensor and the microlens array, b, is greater than the focal length f of the microlenses in the array) and Binocular (where b is less than f). Neither of those cases is exact for a true plenoptic camera, but their fingerprints can be seen in every plenoptic image. As will be show, both are achievable, and are very useful.

Plenoptic Camera Telescopic Case

Figure 10:
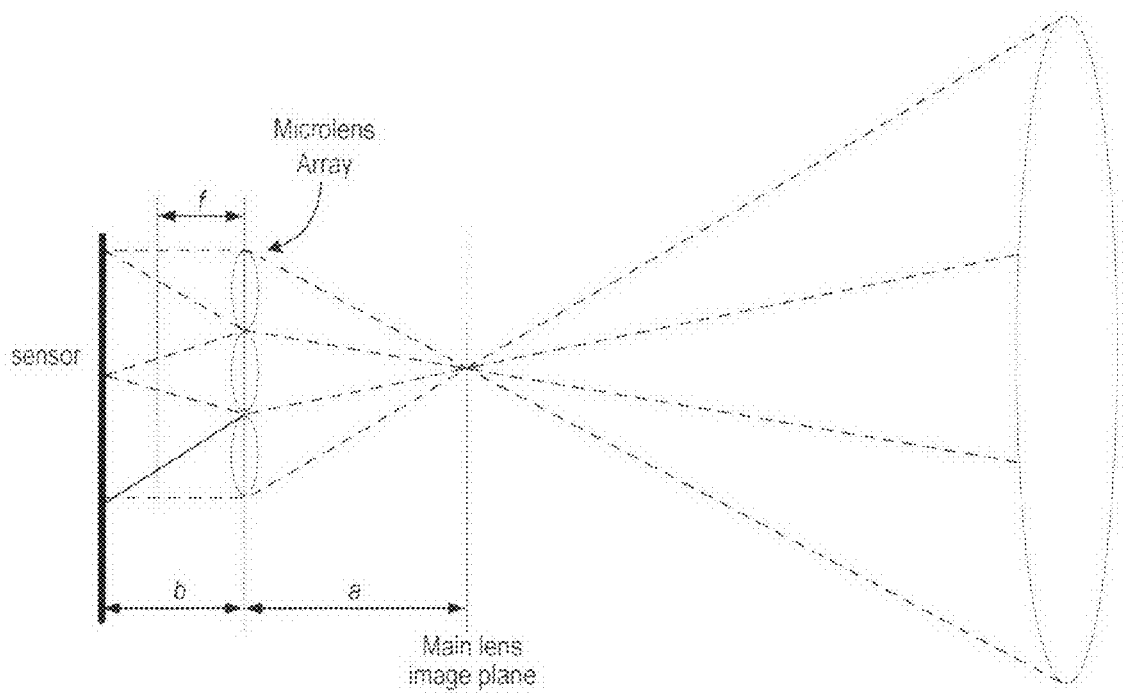
FIG. 10 illustrates the telescopic case for a plenoptic camera.

FIG. 10 illustrates the telescopic case (b>f) for a plenoptic camera. A plenoptic camera may be considered as an array of (Keplerian) telescopes with a common objective lens. (For the moment the issue of microlenses not being exactly focused for that purpose will be ignored.) Each individual telescope in the array has a microcamera (an eyepiece lens and the eye) inside the big camera. Just like any other camera, this microcamera is focused onto one single plane, and maps the image from the plane onto the retina, inverted and reduced in size. A camera can be focused only for planes at distances ranging from f to infinity ($\infty$) according to the lens equation:

$$\frac{1}{a} + \frac{1}{b} = \frac{1}{f}$$

Here, a, b, and f have the same meaning as for the big camera, except on a smaller scale. It can be seen that since a and b must be positive, it is not possible to focus closer than f. In a conventional plenoptic camera, the image plane is fixed at the microlenses. It may be more natural to consider the image plane fixed at distance f in front of the microlenses. In both cases, microimages are out of focus.

Figure 11:
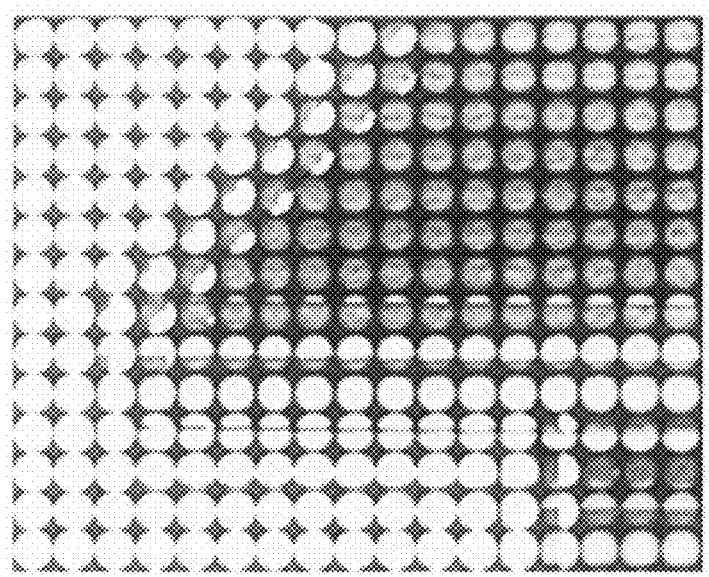
FIG. 11 shows a crop from the roof area in FIG. 9, and visually illustrates the "telescopic" behavior in light-field cameras.

Following the movement of an edge from circle to circle, characteristic behavior of telescopic imaging in the flat light-field may be observed. FIG. 11 shows a crop from the roof area in FIG. 9. FIG. 11 may be used to visually illustrate the "telescopic" behavior. It is possible to observe in FIG. 11 that the edge is repeated two times when moving away from the roof. The farther from the roof a circle is, the farther the edge appears inside that circle. Moving in any given direction, the edge moves relative to the circle centers in the same direction. Once detected in a given area, this behavior is consistent (valid in all directions in that area). Careful observation shows that images in the small circles are indeed inverted patches from the high-resolution image, as if observed through a telescope.

For the telescopic case, a practical range for b may be $f < b \leq 1.5\ f$.

Plenoptic Camera Binocular Case

Figure 12:
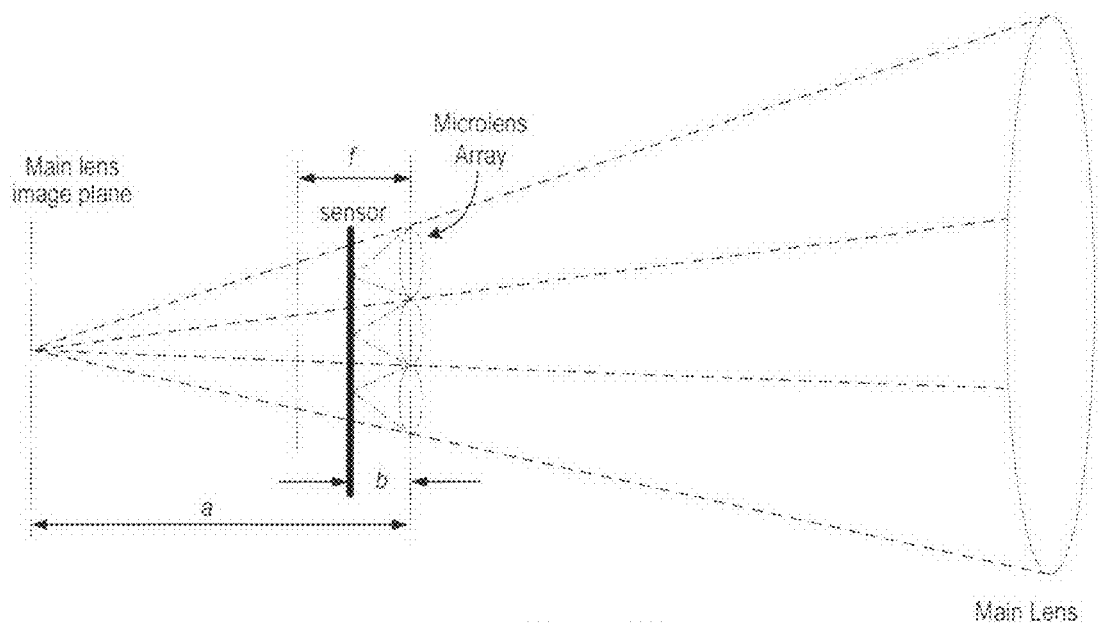
FIG. 12 illustrates the binocular case for a plenoptic camera.
Figure 13:
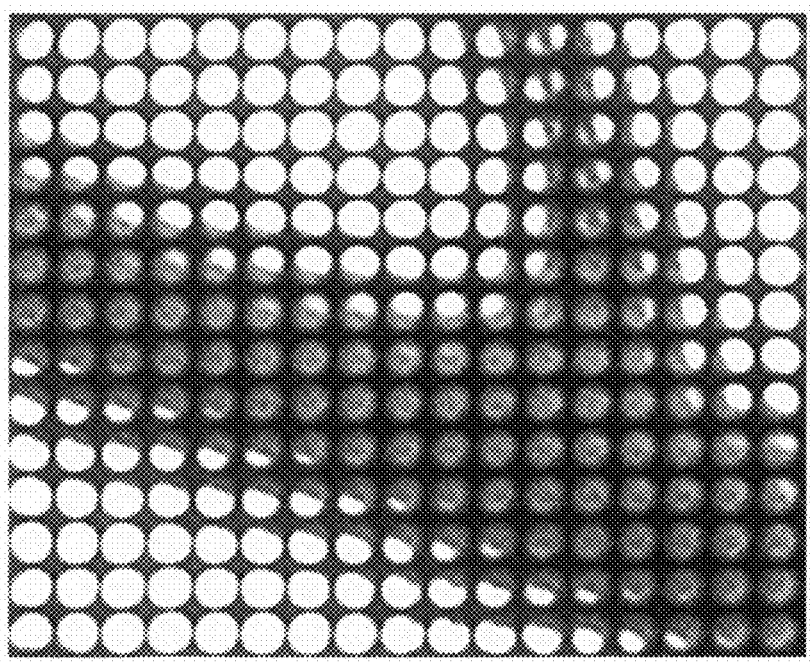
FIG. 13 shows a crop from the tree area in FIG. 9, and visually illustrates the "binocular" behavior in light-field cameras.

FIG. 12 illustrates the binocular (Galilean type telescope) case (b<f) for a plenoptic camera. FIG. 13 shows a crop from the tree area in FIG. 9, and is used to illustrate details of "binocular" imaging in light-field cameras. Note that the image is not inverted in FIG. 13. A plenoptic camera may also be considered as an "incompletely focused" camera, i.e., a camera focused behind the film plane (as in a Galilean telescope/binoculars). If an appropriate positive lens is placed in front of the film, the image would be focused on the film. For a Galilean telescope, this is the lens of the eye that focuses the image onto the retina. For a plenoptic camera, this role is played by the microlenses with focal length f. In the binocular case, the microlenses would need to be placed at a distance smaller than f from the film. Note also that while the telescopic operation inverts the inside image, the binocular operation does not invert it.

As with telescopic imaging, characteristic behavior of binocular imaging can be observed in the plenoptic camera. See FIG. 13, which is a crop from the top left corner in FIG. 9. In FIG. 13, it can be observed that edges are repeated about two or three times when moving away from the branch. The farther from the branch, the closer to the branch the edge appears inside the circle. Moving in any given direction, the edge moves relative to the circle centers in the opposite direction. Once detected in a given area, this behavior is consistent (valid in all directions in that area). This is due to the depth in the image at that location. Careful observation shows that images in the small circles are in fact patches from the corresponding area in the high-resolution image, only reduced in size. The more times the feature is repeated in the circles, the smaller it appears and thus a bigger area is imaged inside each individual circle.

To summarize, an approximately focused plenoptic camera (i.e., a plenoptic camera where b≠f) may be considered as an array of microcameras looking at an image plane in front of the array or behind the array. Each microcamera images only a small part of that plane. The shift between those small images is obvious from the geometry, as explained below in the section titled Analysis. If at least one microcamera could image this entire plane, it could directly capture a high-resolution image. However, the small images are limited in size by the main lens aperture.

The magnification of these microcamera images, and the shift between them, is defined by the distance to the image plane. The distance can be at positive or negative distance from the microlenses, corresponding to the telescopic (positive) and binocular (negative) cases described above. By slightly adjusting the plane of the microlenses (so that the lenses are in focus), embodiments can make use of the telescopic or binocular behavior to generate a high-resolution image from the flat. This process is described in the following sections.

Analysis

In some embodiment, microlenses may not be focused exactly on the plane that is to be imaged, causing the individual microlens images to be blurry. This may limit the amount of resolution that can be achieved. One way to improve such results would be deconvolution. Another way would be to stop down the microlens apertures.

In FIGS. 14A and 14B, the case of a "plenoptic" camera using a pinhole array instead of microlens array is considered. In FIGS. 14A and 14B, an array of pinholes (or microlenses) maps the image in front of the array to the sensor. The distance to the image defines the magnification factor M=n−1. In ray optics, in theory, pinhole images produce no defocus blur, and in this way are perfect. But this is in theory; in the real world, pinholes are replaced with finite but small apertures and microlenses.

From the lens equation:

$$\frac{1}{a} + \frac{1}{b} = \frac{1}{f}$$

it can be seen that, if the distance to the object is a=nf, the distance to the image would be:

$$b = \frac{nf}{n-1}$$

$$n = \frac{b}{b-f}$$

The geometric magnification factor may be defined as M=a/b, which by substitution gives:

$$M=n-1$$

FIG. 14A shows the ray geometry in the telescopic case for n=4, and FIG. 14B shows the ray geometry in the telescopic case for n=2. Note that the distance b from the microlenses to the sensor is always greater than f (this is not represented in FIGS. 14A and 14B). Looking at the geometry in FIGS. 14A and 14B, the images are M times smaller, inverted, and repeated M times.

Full-Resolution Light-Field Rendering Algorithm

Two distinct behaviors (telescopic and binocular) are described above, and embodiments of the full-resolution light-field rendering method may execute a different action based on which behavior is observed in the microimages contained in the light-field image captured by a radiance camera. In one embodiment, if the full-resolution light-field rendering method detects edges (or features) moving relative to the microimage centers (the microimages are generally circular, so may be referred to as circles) in the same direction as the direction of movement, all microimages in that area are inverted relative to their individual centers (this is the telescopic case). If the full-resolution light-field rendering method detects edges moving relative to the microimage centers in a direction opposite to the direction of movement, the method does nothing (this is the binocular case).

The small circles, or microimages, in a light-field image are, effectively, puzzle pieces of the big image, and embodiments of the full-resolution light-field rendering method reproduce the big image by bringing the microimages sufficiently close together. The big image may also be reproduced by enlarging the pieces so that features from any given piece match those of adjacent pieces. Assembling the resized pieces reproduces exactly the high-resolution image.

In either of these approaches, the individual pieces may overlap. FIG. 15 illustrates a lens circle (or microimage) of diameter D and a patch of size m, where m is an integer greater than or equal to 2. One embodiment of the full-resolution light-field rendering method avoids this overlapping by dropping all pixels outside the square of size m, effectively cropping the microimage to an m×m square. Note that other embodiments may crop to other geometric shapes, such as a rectangle.

Conventional rendering methods do not reassemble pixels as described above; the conventional plenoptic camera algorithm produces one pixel per microlens for the output image. Embodiments of the full-resolution light-field rendering method, using the algorithm described above, produce a gain in resolution that is approximately equal to the number of pixels m in the original patches. That is, embodiments produce m×m pixels, or $m^2$ pixels, instead of one pixel, per microimage It has been shown above that the magnification M=n−1. It is also the case that M=D/m. It therefore follows that:

$$n = 1 + \frac{D}{m}$$

From the above, the distance (measured in number of focal lengths) to the image plane in front of the microlens is related to D and m.

It is important to note that lenses produce acceptable images even when they are not exactly in focus. Additionally, out of focus images can be deconvolved, or simply sharpened. For those reasons, the above analysis is actually applicable for a wide range of locations of the image plane. Even if not optimal, such a result is often a useful tradeoff.

The optics of the microlens as a camera is the main factor in determining the quality of each microimage. Blurry images from optical devices may be deconvolved and the sharp image recovered to some extent. In order to do this, the effective kernel of the optical system should be known. While there are limitations in this related to bit depth and noise, embodiments may increase resolution up to m times the resolution of a conventional plenoptic camera and conventional rendering method. Exemplary embodiments have demonstrated a 27× increase of resolution in one plane, and a 10× increase of resolution in another plane, when compared to conventional methods and apparatus, and without any deconvolution. Other embodiments may yield other increases in resolution when compared to conventional methods and apparatus.

Exemplary Results

Some embodiments of a full-resolution radiance camera as described herein may be implemented in film cameras. Embodiments may, for example, be implemented in large-format film cameras. An exemplary large-format film camera embodiment is illustrated in FIG. 8. One exemplary embodiment may, for example, be implemented in large-format film camera using a 135 mm objective lens and 4×5 format film. A full-resolution radiance camera based on a large-format film camera rather than on a digital camera may be used for experimental purposes in order to avoid resolution constraint of digital sensors. However, film camera embodiments of the full-resolution radiance camera design are practical and may have practical applications. In conjunction with current high-resolution scanners used to digitize captured images from negatives or prints, large-format film camera embodiments are capable of 1 gigapixel, or even higher, resolution for the flat or light-field representation of the 4D radiance (the raw light-field image).

A component of the full-resolution radiance camera is a microlens array. FIG. 16 shows a zoom into an exemplary microlens array, and shows individual microlenses and (black) chromium mask between the microlenses. In one embodiment of a microlens array that may be used in the exemplary embodiment based on a large-format film camera, the microlens array includes 146,000 microlenses of diameter 0.25 mm and focal length 0.7 mm. A mechanism inside a 4×5 inch film holder of the large-format film camera holds the microlens array so that the flat side of the glass base is pressed against the film. In one embodiment, the thickness of the microlens array is such that, when placed against the film, the microlenses are distance f from the film. Other configurations of microlens arrays are possible, and the configuration of the large-format film camera makes it possible to easily change configurations of microlenses by simply using a different microlens array. Microsheets of glass may be used in the assembly as spacers or shims between the microlens array and the film to increase the distance from the microlenses and the film to be greater than f (e.g., $4/3$ f). An exemplary thickness of a microsheet that may be used is 0.23 mm. Inserting microsheet glass provides spacing in a rigorously controlled manner. In one embodiment, additional spacing may be created by adding a single microsheet between the film and the microlenses in order to displace the microlenses by an additional $1/3$ f approximately 0.2 mm from the sensor. Additional microsheets may be added to provide additional spacing.

Experiments may be conducted both with and without inserting microsheets of glass as spacers or shims between the microlens array and the film in the exemplary film camera used for testing. In both cases, the focal length of the microlenses is f=0.700 mm. The spacing in two experimental conditions differ as follows:

b=0.71 mm so that n=71 and M=70, which is made possible directly by the thickness of glass of the microlens array assembly itself, and b=0.94 mm based on microsheet glass between microlens array and film. As a result, n=3.9 (almost 4) and M=3, approximately.

High-Resolution Rendering Results

FIGS. 17 through 20 are used to illustrate experimental results from applying the full-resolution rendering method to flats, i.e. light-field images, captured with the exemplary full-resolution radiance camera based on a large-format film camera described above. In particular, the operation of rendering in both the telescopic case and the binocular case is illustrated and described.

Figure 17:
FIG. 17 shows a portion of a digitized light-field image.

The original, unrendered light-field image (also referred to as a flat) was generated by capturing the image on film using the exemplary radiance camera based on a large-format film camera, and digitizing the image via a scanning process using a high-resolution scanner. A portion of the digitized light-field image is shown in FIG. 17. After digitization, the full original light-field image is 24,862×21,818 pixels, of which 2,250×1,950 pixels are shown in FIG. 17. The approximate region of the original light-field image extracted to produce FIG. 17 is shown by small solid white rectangle in FIG. 18C.

Figure 18A:
FIGS. 18A through 18C show output images rendered from a light-field image using conventional rendering methods.
Figure 18B:
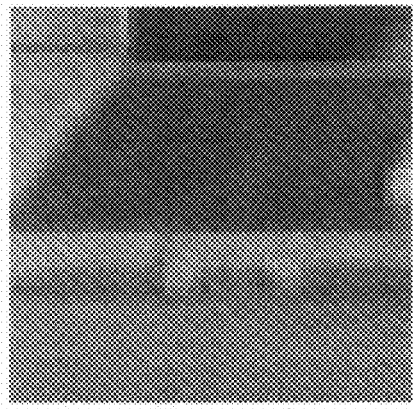
Figure 18C:

Output images rendered from the light-field image using conventional rendering methods are shown in FIGS. 18A through 18C. The entire light-field image was rendered with the conventional method, resulting in a 408×357 pixel image. FIG. 18A is rendered at 300 ppi, while FIG. 18C is rendered at 72 ppi. At 300 ppi, the image is only about 1 inch by 1 inch. FIG. 18B shows a 27× magnification of a crop of the curb area from the 300 ppi image in FIG. 18A. The solid white rectangle in FIG. 18C shows the region from the light-field shown in FIG. 17. The dashed white rectangle in FIG. 18C shows a region that is rendered according to an embodiment of the full-resolution light-field method as shown in FIGS. 19 and 20.

Figure 19:
FIG. 19 show a full-resolution rendering of a light-field, rendered assuming the telescopic case according to one embodiment of the full-resolution light-field rendering method.

FIG. 19 show a full-resolution rendering of the experimental light-field, rendered assuming the telescopic case according to one embodiment of the full-resolution light-field rendering method described herein. This region of the image is shown by the dashed white rectangle in FIG. 18C. For this rendering, the scaling-down factor was taken to be approximately 2.4, so that the full-resolution rendered image measured 11016×9666, i.e., over 100 megapixels. Even though the image is at 300 dpi, only a 2,250×1,950 region is shown in FIG. 19. The image is well-focused at full-resolution in the region of the house, but not well-focused on the tree branches.

Figure 20:
FIG. 20 shows a full-resolution rendering of a light-field, rendered assuming the binocular case according to one embodiment of the full-resolution light-field rendering method.

FIG. 20 shows a full-resolution rendering of the experimental light-field, rendered assuming the binocular case according to one embodiment of the full-resolution light-field rendering method described herein. This region of the image is shown by the dashed white rectangle in FIG. 18C. Note that, in contrast to the image in FIG. 20, this image is well-focused at full-resolution in the region of the tree branches but not well-focused on the house.

Figure 21:
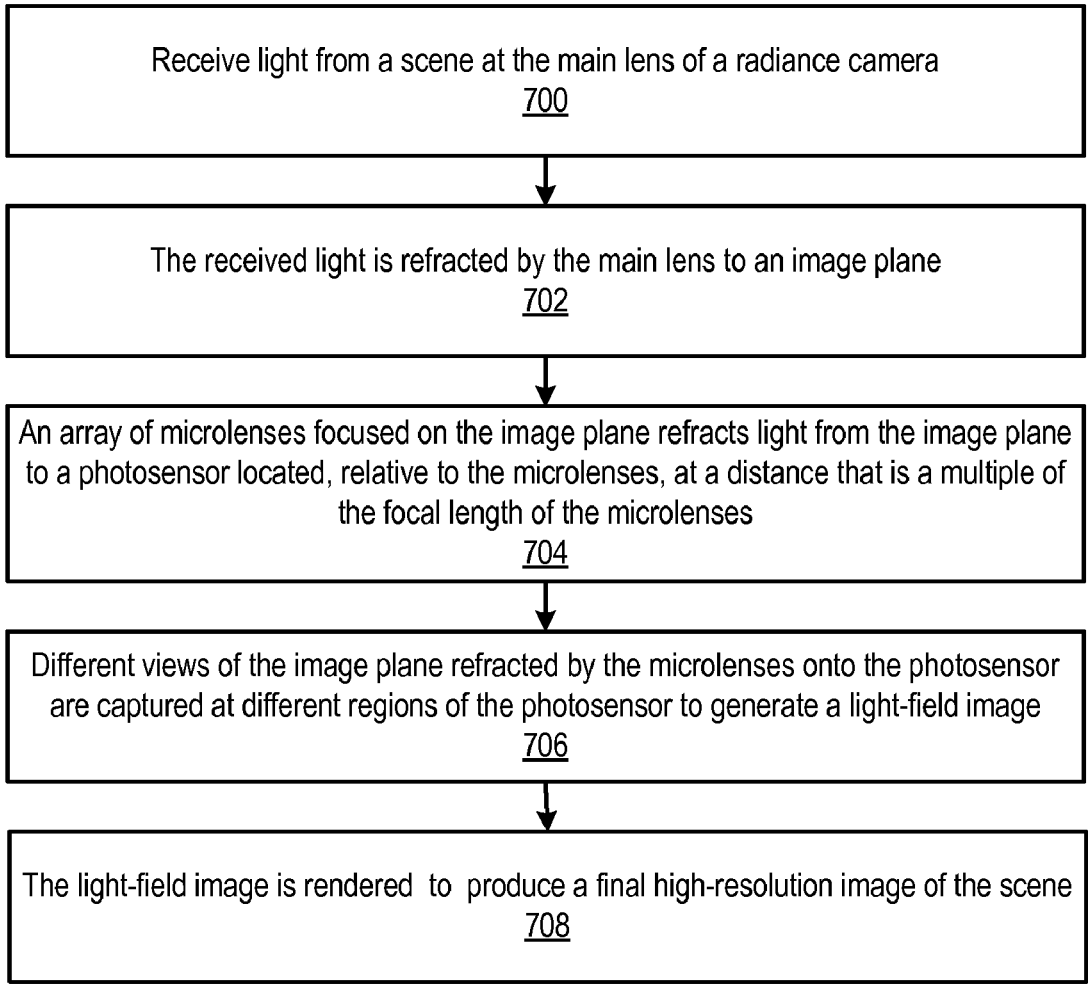
FIG. 21 is a flow chart illustrating how light is directed within a radiance camera according to one embodiment.

FIG. 21 is a flow chart illustrating how light is directed within a radiance camera according to one embodiment. As indicated at 700, light from a scene is received at the main lens of a radiance camera. FIGS. 6, 7 and 8 illustrate exemplary radiance cameras. As indicated at 702, the received light is refracted by the main lens to an image plane. As indicated at 704, an array of microlenses, the microlenses of which are focused on the image plane, refracts light from the image plane onto a photosensor located, relative to the microlenses, at a distance that is a multiple of the focal length f of the microlenses. For example, the distance between the microlenses and the photosensor may be $3/4$ f, $4/3$ f, $5/3$ f, 1.5 f and so on. As indicated at 706, different views of the image plane, refracted by the microlenses onto the photosensor, are captured at different regions of the photosensor to generate a light-field image. In some embodiments, the photosensor may be a device configured to digitally capture light such as a CCD, while in other embodiments the photosensor may be conventional film. As indicated at 708, the captured light-field image may be rendered to produce a final high-resolution image, or images, of the scene, for example using a full-resolution light-field rendering method as described in FIG. 22. For light-field images captured on conventional film, the light-field image may be digitized to generate a digitized light-field image before rendering.

Figure 22:
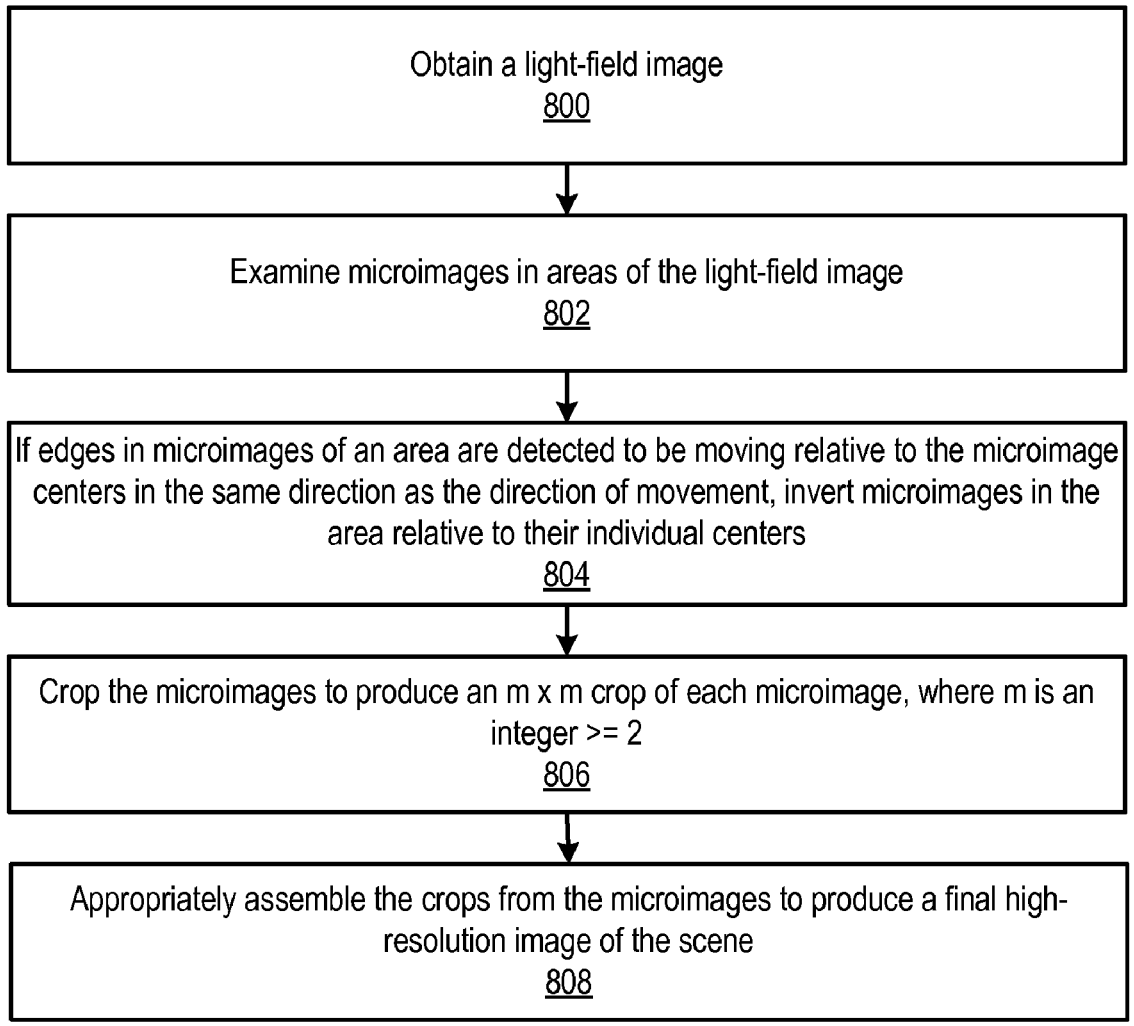
FIG. 22 is a flowchart of a full-resolution light-field rendering method according to one embodiment.

FIG. 22 is a flowchart of a full-resolution light-field rendering method according to one embodiment. As indicated at 800, a light-field image captured by a radiance camera may be obtained (see, e.g., FIG. 9 for an example of what such a light-field image may look like to a human observer). As indicated at 802, microimages in areas of the light-field image may be examined to determine the direction of movement of edges in the microimages relative to a direction of movement of the algorithm. At 804 if it is determined that edges in microimages of an area are moving relative to the microimage centers in the same direction as the direction of movement, the microimages in that area may be inverted relative to their individual centers. As indicated at 806, the microimages may each be cropped to produce an m×m subregion or crop of each microimage, where m is an integer greater than two. As indicated at 808, the subregions or crops from the microimages may be appropriately assembled to produce a final high-resolution image of the scene.

Figure 23:
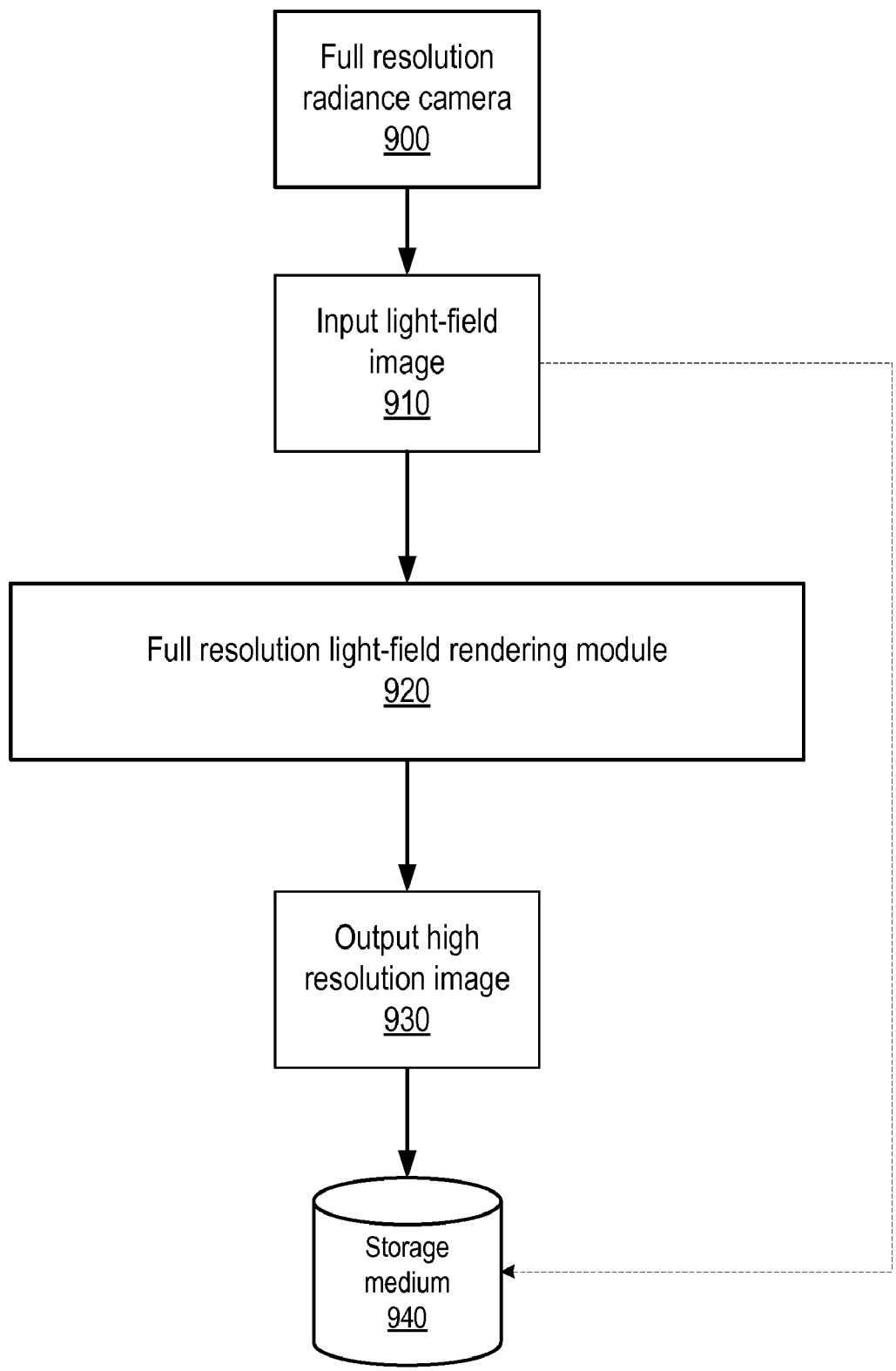
FIG. 23 illustrates a full-resolution light-field rendering module rendering a high-resolution image from a light-field captured, for example, by a radiance camera, according to one embodiment.

FIG. 23 illustrates a full-resolution light-field rendering module rendering a high-resolution image from a light-field captured, for example, by a radiance camera, according to one embodiment. Light-field rendering module 920 may implement a full-resolution light-field rendering method as described in FIG. 22. FIG. 24 illustrates an exemplary computer system on which embodiments of light-field rendering module 920 may be implemented. In some embodiments of a radiance camera, light-field rendering module 920 may be implemented in the camera, e.g. in captured data processing module 260 of radiance camera 200 illustrated in FIG. 7. Referring to FIG. 23, light-field rendering module 920 receives an input light-field image 910 captured by a radiance camera, such as one of the embodiments of full-resolution radiance cameras described herein. Exemplary portions of a light-field image as may be captured by an exemplary embodiment of a radiance camera are illustrated in FIGS. 9 and 17. Light-field rendering module 920 then processes the input image 910 according to the full-resolution light-field rendering method described herein. Light-field rendering module 920 generates as output a high-resolution image 930. FIGS. 19 and 20 illustrate exemplary high-resolution images that may be rendered and output by light-field rendering module 920. Output image 930 may, for example, be stored to a storage medium 940, such as system memory, a disk drive, DVD, CD, etc. The dashed line from input image 910 to storage medium 940 indicates that the original (input) light-field image 910 may also be stored.

In one embodiment of a full-resolution light-field rendering method implemented in a full-resolution light-field rendering module 920, the time required to render an image is proportional to the number of microlenses times the number of pixels sampled under each microlens. In other words, the time required to render an image is directly proportional to the size of the output image.

Exemplary System

Embodiments of a full-resolution light-field rendering module as described herein may be executed on one or more computer systems, which may interact with various other devices. One such computer system is illustrated by FIG. 24. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a full-resolution light-field rendering module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 24, memory 1020 may include program instructions 1025, configured to implement embodiments of a full-resolution light-field rendering module as described herein, e.g. a direct lighting module 300, an indirect lighting module 800, or a global illumination rendering module 900, and data storage 1035, comprising various data accessible by program instructions 1025. In one embodiment, program instructions 1025 may include software elements of embodiments of a full-resolution light-field rendering module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a full-resolution light-field rendering module as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A camera, comprising:
a photosensor configured to capture light projected onto the photosensor;
an objective lens, wherein the objective lens is configured to refract light from a scene located in front of the camera to form an image of the scene at an image plane of the objective lens, wherein the objective lens is not focused on the photosensor; and
a microlens array positioned between the objective lens and the photosensor, wherein the microlens array comprises a plurality of microlenses, wherein the plurality of microlenses are focused on the image plane and not on the objective lens;
wherein each microlens of the microlens array is configured to project a focused microimage of a separate contiguous portion of the image of the scene formed at the image plane by the objective lens onto a separate region of the photosensor, wherein each separate region of the photosensor captures a plurality of contiguous pixels.

2. The camera as recited in claim 1, wherein the microlenses in the microlens array are at a distance b from the photosensor, wherein f is the focal length of the microlenses, and wherein b is greater than f.

3. The camera as recited in claim 2, wherein b is 4/3 f.

4. The camera as recited in claim 2, wherein b is less than or equal to 1.5 f.

5. The camera as recited in claim 2, wherein the camera is configured such that one or more spacers have been inserted between the microlens array and the photosensor to determine the distance b.

6. The camera as recited in claim 1, wherein the microlenses in the microlens array are at a distance b from the photosensor, wherein f is the focal length of the microlenses, and wherein b is less than f.

7. The camera as recited in claim 1, wherein the microlenses in the microlens array are at a distance b from the photosensor, wherein the camera is configured such that the distance b is adjustable.

8. The camera as recited in claim 7, wherein the camera comprises an adjuster configured to adjust the distance b.

9. The camera as recited in claim 8, wherein the adjuster is configured to adjust the distance b in response to user input to the camera.

10. The camera as recited in claim 8, wherein the adjuster is configured to automatically adjust the distance b in response to detection of a change in an optical characteristic of the camera.

11. The camera as recited in claim 1, wherein the photosensor is configured to capture a light-field image of the scene that includes each of the separate portions of the image of the scene projected onto the photosensor in a separate region of the light-field image.

12. The camera as recited in claim 11, wherein the camera is configured to store the captured light-field image to a memory device.

13. The camera as recited in claim 12, wherein the memory device is a component of the camera.

14. The camera as recited in claim 12, wherein the memory device is implemented in a computing device separate from the camera.

15. The camera as recited in claim 1, wherein the photosensor is a digital medium.

16. The camera as recited in claim 15, wherein the digital medium is a charge-coupled device (CCD).

17. The camera as recited in claim 1, wherein the photosensor is a film.

18. A method for capturing light-field images, comprising:
receiving light from a scene at an objective lens of a camera;
refracting light from the objective lens to form an image of the scene at an image plane of the objective lens;
receiving light from the image plane at a microlens array located between the objective lens and a photosensor of the camera, wherein the microlens array comprises a plurality of microlenses, wherein the plurality of microlenses are focused on the image plane and not on the objective lens,
and wherein the objective lens is not focused on the photosensor;
receiving light from the microlens array at the photosensor, wherein the photosensor receives a focused microimage of a separate contiguous portion of the image of the scene formed at the image plane by the objective lens from each microlens of the microlens array at a separate region of the photosensor, wherein each separate region of the photosensor captures a plurality of contiguous pixels.

19. The method as recited in claim 18, wherein the microlenses in the microlens array are at a distance b from the photosensor, wherein f is the focal length of the microlenses, and wherein b is greater than f.

20. The method as recited in claim 19, wherein b is 4/3 f.

21. The method as recited in 19, wherein b is less than or equal to 1.5 f.

22. The method as recited in claim 18, wherein the microlenses in the microlens array are at a distance b from the photosensor, wherein f is the focal length of the microlenses, and wherein b is less than f.

23. The method as recited in claim 18, wherein the microlenses in the microlens array are at a distance b from the photosensor, the method further comprising changing the distance b.

24. The method as recited in claim 23, wherein said changing the distance b comprises manually inserting or removing one or more spacers between the microlens array and the photosensor.

25. The method as recited in claim 23, wherein said changing the distance b comprises:
receiving user input specifying a different distance b; and
adjusting the distance between the photosensor and the microlens array to the specified different distance b.

26. The method as recited in claim 23, wherein said changing the distance b comprises:
detecting a change in an optical characteristic of the camera; and
automatically adjusting the distance between the photosensor and the microlens array in accordance with the detected change in the optical characteristic of the camera.

27. The method as recited in claim 18, further comprising capturing a light-field image of the scene at the photosensor, wherein the light-field image includes each of the separate portions of the image of the scene in a separate region of the light-field image.

28. The method as recited in claim 27, further comprising storing the captured light-field image to a memory device.

29. The method as recited in claim 18, wherein the photosensor is a digital medium.

30. The method as recited in claim 18, wherein the photosensor is a film.

31. An apparatus, comprising:
a camera comprising an objective lens, wherein the objective lens is configured to refract light from a scene located in front of the camera to form an image of the scene at an image plane of the objective lens;
a film holder configured to hold a film and to be inserted into and removed from the camera, wherein the objective lens is not focused on the film holder; and
a microlens array configured to be placed in the film holder against the film such that the microlens array is between the film and the objective lens of the camera when the film holder is inserted into the camera, wherein the microlens array comprises a plurality of microlenses on one surface, wherein the opposite surface of the microlens array is smooth glass, wherein the smooth glass surface is configured to be positioned next to the film, and wherein the plurality of microlenses are focused on the image plane and not on the objective lens when the film holder is inserted into the camera;
wherein each microlens of the microlens array is configured to project a focused microimage of a separate contiguous portion of the image of the scene formed at the image plane by the objective lens onto a separate region of the film.

32. The apparatus as recited in claim 31, wherein the microlenses in the microlens array are at a distance b from the film, wherein f is the focal length of the microlenses, and wherein b is equal to f.

33. The apparatus as recited in claim 31, wherein the microlenses in the microlens array are at a distance b from the film, wherein f is the focal length of the microlenses, and wherein b is greater than f.

34. The apparatus as recited in claim 33, wherein b is 4/3 f.

35. The apparatus as recited in claim 33, wherein b is less than or equal to 1.5 f.

36. The apparatus as recited in claim 31, wherein the microlenses in the microlens array are at a distance b from the film, wherein f is the focal length of the microlenses, and wherein b is less than f.

37. The apparatus as recited in claim 31, further comprising one or more spacers configured to be placed between the microlens array and the film in the film holder to adjust the distance between the microlens array and the film.

38. The apparatus as recited in claim 36, wherein the spacers are sheets of clear glass.

* * * * *